US010734122B2

(12) United States Patent
Cisneros, Jr. et al.

(10) Patent No.: US 10,734,122 B2
(45) Date of Patent: Aug. 4, 2020

(54) NEUTRON REFLECTOR ASSEMBLY FOR DYNAMIC SPECTRUM SHIFTING

(71) Applicant: TerraPower, LLC, Bellevue, WA (US)

(72) Inventors: Anselmo T. Cisneros, Jr., Seattle, WA (US); Charles Gregory Freeman, Kirkland, WA (US); Christopher J. Johns, Tacoma, WA (US); Kevin Kramer, Redmond, WA (US); Jeffery F. Latkowski, Mercer Island, WA (US)

(73) Assignee: TerraPower, LLC, Bellevue, WA (US)

( * ) Notice: Subject to any disclaimer, the term of this patent is extended or adjusted under 35 U.S.C. 154(b) by 0 days.

(21) Appl. No.: 15/282,814

(22) Filed: Sep. 30, 2016

(65) Prior Publication Data

US 2017/0092381 A1 Mar. 30, 2017

Related U.S. Application Data

(60) Provisional application No. 62/337,235, filed on May 16, 2016, provisional application No. 62/234,889, filed on Sep. 30, 2015.

(51) Int. Cl.
*G21C 7/28* (2006.01)
*G21C 3/54* (2006.01)
(Continued)

(52) U.S. Cl.
CPC .............. *G21C 7/28* (2013.01); *G21C 1/026* (2013.01); *G21C 3/54* (2013.01); *G21C 7/22* (2013.01);
(Continued)

(58) Field of Classification Search
CPC .......... G21C 1/026; G21C 11/06; G21C 3/54; G21C 7/22; G21C 7/27; G21C 7/28
(Continued)

(56) References Cited

U.S. PATENT DOCUMENTS 2,874,106 A  2/1959  Hammond
2,920,024 A  1/1960  Barton et al.
(Continued)

FOREIGN PATENT DOCUMENTS

CA  631890 A  11/1961
CN  1922695  2/2007
(Continued)

OTHER PUBLICATIONS

Holcomb, et al. "Fast Spectrum Molten Salt Reactor Options", Jul. 2011, 46 pages. Available at: http://info.ornl.gov/sites/publications/files/Pub29596.pdf.
(Continued)

*Primary Examiner* — Jack W Keith
*Assistant Examiner* — Daniel Wasil

(57) ABSTRACT

A dynamic neutron reflector assembly for a "breed-and-burn" fast reactor incrementally adjusts neutron spectrum and reactivity in a reactor core. The composition of materials in the dynamic neutron reflector may be adjusted to change neutron reflectivity levels, or to introduce neutron moderating or absorption characteristics. The dynamic neutron reflector may contain a flowing reflecting liquid of adjustable volume and/or density. Submergible members may be selectively inserted into the flowing reflecting liquid to alter its volume and introduce other neutron modifying effects such as moderation or absorption. Selective insertion of the submergible members allows for concentration of the neutron modifying effects in a selected portion of the reactor core. The flowing reflecting liquid may also act as a secondary coolant circuit by exchanging heat with the molten fuel salt.

27 Claims, 21 Drawing Sheets

(51) Int. Cl.
  *G21C 1/02* (2006.01)
  *G21C 7/22* (2006.01)
  *G21C 7/27* (2006.01)
  *G21C 11/06* (2006.01)

(52) U.S. Cl.
  CPC ............... *G21C 7/27* (2013.01); *G21C 11/06* (2013.01); *Y02E 30/34* (2013.01); *Y02E 30/39* (2013.01)

(58) Field of Classification Search
  USPC .................................................. 376/220, 221
  See application file for complete search history.

(56) References Cited

U.S. PATENT DOCUMENTS

| | | | |
|---|---|---|---|
| 2,945,794 A | 7/1960 | Winters et al. | |
| 3,010,889 A | 11/1961 | Fortescue | |
| 3,029,130 A | 4/1962 | Moore | |
| 3,046,212 A | 7/1962 | Anderson | |
| 3,136,700 A | 6/1964 | Poppendiek | |
| 3,216,901 A | 11/1965 | Teitel | |
| 3,218,160 A | 11/1965 | Knighton et al. | |
| 3,275,422 A | 9/1966 | Cathers | |
| 3,287,225 A * | 11/1966 | Ackroyd | G21C 7/28 376/220 |
| 3,383,285 A | 5/1968 | Ackroyd | |
| 3,996,099 A | 12/1976 | Faugeras | |
| 4,039,377 A | 8/1977 | Andrieu | |
| 4,045,286 A | 8/1977 | Blum | |
| 4,056,435 A | 11/1977 | Carlier | |
| 4,342,721 A | 8/1982 | Pomie | |
| 4,397,778 A | 8/1983 | Lloyd | |
| 4,762,667 A | 8/1988 | Sharbaugh | |
| 5,185,120 A | 2/1993 | Fennern | |
| 5,196,159 A | 3/1993 | Kawashima | |
| 5,380,406 A | 1/1995 | Horton | |
| 5,421,855 A | 6/1995 | Hayden | |
| 5,596,611 A | 1/1997 | Ball | |
| 5,730,874 A | 3/1998 | Wai et al. | |
| 5,770,085 A | 6/1998 | Wai et al. | |
| 5,792,357 A | 8/1998 | Wai et al. | |
| 5,910,971 A | 6/1999 | Ponomarev-Stepnoy | |
| 6,181,759 B1 | 1/2001 | Heibel | |
| 7,217,402 B1 | 5/2007 | Miller | |
| 8,132,410 B2 | 3/2012 | Oh | |
| 8,416,908 B2 | 4/2013 | Mann | |
| 8,529,713 B2 | 9/2013 | Ahlfeld et al. | |
| 9,171,646 B2 | 10/2015 | Moses et al. | |
| 10,141,079 B2 | 11/2018 | Czerwinski | |
| 10,438,705 B2 | 10/2019 | Cheatham | |
| 10,497,479 B2 | 12/2019 | Abbott et al. | |
| 2004/0114703 A1 | 6/2004 | Bolton | |
| 2005/0220251 A1 | 10/2005 | Yokoyama | |
| 2008/0310575 A1 | 12/2008 | Cinotti | |
| 2011/0131991 A1 | 6/2011 | Chang et al. | |
| 2011/0286563 A1 | 11/2011 | Moses | |
| 2011/0286565 A1 | 11/2011 | Tsang | |
| 2011/0305309 A1 | 12/2011 | Brown | |
| 2012/0056125 A1 | 3/2012 | Raade | |
| 2012/0069946 A1 | 3/2012 | Hamill et al. | |
| 2012/0183112 A1 | 7/2012 | Leblanc | |
| 2012/0288048 A1 | 11/2012 | Mann | |
| 2013/0083878 A1 | 4/2013 | Massie | |
| 2013/0180520 A1 | 7/2013 | Raade | |
| 2014/0166924 A1 | 6/2014 | Raade | |
| 2014/0348287 A1 | 11/2014 | Huke | |
| 2015/0010875 A1 | 1/2015 | Raade | |
| 2015/0117589 A1 | 1/2015 | Kamei | |
| 2015/0036779 A1 | 2/2015 | Leblanc | |
| 2015/0078504 A1 | 3/2015 | Woolley | |
| 2015/0228363 A1 | 8/2015 | Dewan | |
| 2015/0243376 A1 | 8/2015 | Wilson | |
| 2015/0357056 A1 | 12/2015 | Shayer | |
| 2016/0005497 A1 | 1/2016 | Scott | |
| 2016/0189806 A1 | 6/2016 | Cheatham, III et al. | |
| 2016/0189812 A1 | 6/2016 | Czerwinski | |
| 2016/0189813 A1 | 6/2016 | Cisneros | |
| 2016/0189816 A1 | 6/2016 | Czerwinski | |
| 2016/0217874 A1 | 7/2016 | Dewan | |
| 2016/0260509 A1 | 9/2016 | Kim et al. | |
| 2017/0084355 A1 | 3/2017 | Scott | |
| 2017/0117065 A1 | 4/2017 | Scott | |
| 2017/0301413 A1 | 10/2017 | Cisneros | |
| 2017/0301421 A1 | 10/2017 | Abbott | |
| 2017/0316840 A1 | 11/2017 | Abbott | |
| 2017/0316841 A1 | 11/2017 | Abbott et al. | |
| 2018/0019025 A1 | 1/2018 | Abbott et al. | |
| 2018/0047467 A1 | 2/2018 | Czerwinski | |
| 2018/0068750 A1 | 3/2018 | Cisneros | |
| 2018/0137944 A1 | 5/2018 | Abbott | |
| 2019/0139665 A1 | 5/2019 | Czerwinski | |
| 2019/0237205 A1 | 8/2019 | Abbott | |
| 2020/0027590 A1 | 1/2020 | Cisneros | |
| 2020/0122109 A1 | 4/2020 | Kruizenga | |
| 2020/0185114 A1 | 6/2020 | Abbott | |

FOREIGN PATENT DOCUMENTS

| | | |
|---|---|---|
| CN | 101939793 | 1/2011 |
| CN | 104145309 | 11/2014 |
| DE | 1112791 | 8/1961 |
| DE | 1439107 | 2/1969 |
| EP | 0617430 | 9/1994 |
| FR | 2296248 | 7/1976 |
| GB | 739968 | 11/1955 |
| GB | 835266 | 5/1960 |
| GB | 964841 | 7/1964 |
| GB | 2073938 | 10/1981 |
| GB | 2511113 | 8/2014 |
| GB | 2508537 | 12/2014 |
| GB | 2516046 | 1/2015 |
| JP | S 35-13995 B | 9/1960 |
| JP | S57 1991 | 1/1982 |
| JP | 1991282397 | 12/1991 |
| JP | 11-174194 | 7/1999 |
| JP | H11 174194 | 7/1999 |
| JP | 2001-133572 | 5/2001 |
| JP | 2003-063801 | 3/2003 |
| JP | 2010-223942 | 10/2010 |
| JP | 2012-047531 | 3/2012 |
| JP | 2014-119429 | 6/2014 |
| RU | 57040 U1 | 9/2006 |
| RU | 2424587 C1 | 7/2011 |
| WO | WO 2000/03399 | 1/2000 |
| WO | WO 2013/085383 | 6/2013 |
| WO | WO 2013/116942 | 8/2013 |
| WO | 2014/039641 | 3/2014 |
| WO | WO 2014/0128457 | 8/2014 |
| WO | 2014/196338 | 12/2014 |
| WO | 2014/074930 | 5/2015 |
| WO | WO 2013/180029 | 5/2015 |
| WO | 2015/140495 | 9/2015 |
| WO | 2016/109565 | 7/2016 |
| WO | WO 2018013317 | 1/2018 |

OTHER PUBLICATIONS

Abbott et al, Thermal and Mechanical Design Aspects of the LIFE Engine, Fusion Science and Technology Dec. 2008; 56(2).

Kramer et al., Parameter study of the LIFE engine nuclear design, Energy Conversion and Management, 51, pp. 1744-1750, 2010.

Kramer et al., Fusion-Fission Blanket Options for the LIFE Engine, Fusion Science and Technology, vol. 60, pp. 72-77, Jul. 2011.

International Search Report and Written Opinion—PCT/US2017/030666 dated Jul. 20, 2017.

International Search Report and Written Opinion—PCT/US2016/055001 dated Jan. 25, 2017.

Chapter 20, Creeping Flow, Physics of Continuous Matter, Exotic and Everyday Phenomena in the Macroscopic World, Lautrup, B., The Niels Bohr Institute, Copenhagen, Denmark, 2004.

(56) References Cited

OTHER PUBLICATIONS

Harder, et al. "Compatibility and Processing Problems in the Use of Molten Uranium Chloride-Alkali Chloride Mixtures as Reactor Fuels", UKAEA, Atomic Energy Research Establishment, Harwell, England, 28 pages.
Wang Shaofen et al., "Application of Supercritical Fluid Extraction Technology on the Treatment of Nuclear Waste", Applied Chemistry, vol. 20, No. 5, pp. 409-414, May 31, 2003.
Molten Salt Reactor (MSR) Review: Feasibility Study of developing a pilot scale molten salt reactor in the UK, Jul. 2015, Energy Process Development, LTD., www.energyprocessdevelopments. com.
Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982, 310 pgs.
PCT International Preliminary Report on Patentability in International Application PCT/US2015/067905 dated Jan. 4, 2017, 14 pages.
PCT International Preliminary Report on Patentability in International Application PCT/US2016/055001, dated Apr. 3, 2018, 8 pages.
PCT International Search Report and Written Opinion in International Application PCT/US2017/061843, dated Oct. 29, 2018, 23 pages.
PCT International Preliminary Report on Patentability in International Application PCT/US2017/061843, dated May 21, 2019, 13 pages.
PCT International Search Report and Written Opinion in International Application PCT/US2017/038806, dated Oct. 16, 2017, 13 pgs.
PCT International Preliminary Report on Patentability in International Application PCT/US2017/038806, dated Jan. 15, 2019, 7 pgs.
Maltsev et al., "Redox potentials of uranium in molten eutectic mixture of lithium, potassium, and cesium chlorides", Russian Metallurgy, Maiknauka- Interperidica, RU, vol. 2016, No. 8, Dec. 2016, 2 pgs.
Kuznetsov et al., "Electrochemical Behavior and Some Thermodynamic Properties of UCl [sub 4] and UCl [sub 3] Dissolved in a LiCl-KCl Eutectic Melt", Journal of the Electrochemical Society, vol. 152, No. 4, Jan. 2005, 11 pgs.
PCT International Search Report and Written Opinion in International Application PCT/US2017/046139, dated Jan. 17, 2018, 16 pages.
PCT International Preliminary Report on Patentability in International Application PCT/US2017/046139, dated Feb. 12, 2019, 8 pages.
PCT International Search Report and Written Opinion in International Application PCT/US2019/015967, dated Jun. 12, 2019, 25 pages.
PCT International Search Report and Written Opinion in International Application PCT/US2019/021791, dated Nov. 19, 2019, 15 pages.
Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.
Ashraf-Khorassani, Mehdi, Michael T. Combs, and Larry T. Taylor. "Solubility of metal chelates and their extraction from an aqueous environment via supercritical CO2." Talanta 44.5 (1997): 755-763.
ASTM International, Designation: B898-11, Standard Specification for Reactive and Refractory Metal Clad Plate (Sep. 2011), 15 pages.
Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, Aug. 1969.
Bertch, T.C., Selective Gaseous Extraction: Research, Development and Training for Isotope Production, Final Technical Report for the Period Apr. 1, 2012 through Mar. 31, 2014, General Atomics, 27 pgs.

Borts, B., et al. "The study of supercritical extraction of complexes of molybdenum with carbon dioxide." 6 (6) (2016): 57-63.
Chou, Wei-Lung, et al. "Removal of gallium (III) ions from acidic aqueous solution by supercritical carbon dioxide extraction in the green separation process." Journal of hazardous materials 160.1 (2008): 6-12.
Cohen et al., "Vanadium-Lined HT9 Cladding Tubes", Argonne National Lab ANL/ET/CP-80384, (Feb. 1994), 12 pgs.
Donnelly et al., Fabrication of Heat Exchanger Tube Bundle for the Molten-Salt Reactor Experiment, ORNL-3500, Dec. 9, 1963, 42 pgs.
European Extended Search Report for EP 15876187.4 dated Sep. 11, 2018, 10 pages.
European Extended Search Report in European Application EP15875826.8, dated Sep. 6, 2018, 7 pages.
Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.
Forsberg et al., Fluoride-Salt-Cooled High-Temperature Reactor (FHR) for Power and Process Heat, Final Project Report, MIT-ANP-TR-157, Dec. 2014, 62 pgs.
Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.
Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.
Freeman et al., "Archimedes Plasma Mass Filter", AIP Conf. Proc. 694, 403 (2003), 9 pages.
Gen IV International Forum, Molten Salt Reactor (MSR), https://www.gen-4.org/gif/jcms/c_9359/msr, accessed Feb. 26, 2016, 3 pgs.
Grimes, W.R., "Molten-Salt Reactor Chemistry" Nucl. Appl. Technol. 8(137) (1970), 19 pgs.
Hung, Laurence, et al. "Supercritical CO2 extraction of molybdenum-ligand complexes from sulfuric solutions." The Journal of Supercritical Fluids 111 (2016): 97-103.
Li et al., "Affinity Extraction into CO2. 2. Extraction of Heavy Metals into CO2 from Low-pH Aqueous Solutions", Ind. Eng. Chem. Res. 37:4763-4773 (1998).
Lin et al., "Supercritical fluid extraction and chromatography of metal chelates and organometallic compounds" trends in analytical chemistry 14(3):123-133 (1995).
Mekki et al., "Extraction of Lanthanides from Aqueous Solution by Using Room-Temperature Ionic Liquid and Supercritical Carbon Dioxide in Conjunction" Chem. Eur. J. 12:1760-1766 (2006).
Merle-Lucotte, E., Introduction to the Physics of the Molten Salt Fast Reactor, Thorium Energy Conference 2013 (ThEC13), 2013, 82 pgs.
Mourogov et al., Potentialities of the fast spectrum molten salt reactor concept: REBUS-3700, Energy Conversion and Management, Mar. 30, 2006, vol. 47, No. 17, pp. 2761-2771.
MSR-FUJI General Information, Technical Features, and Operating Characteristics., pp. 1-30.
Ottewitte, E. H., Cursory First Look at the Molten Chloride Fast Reactor as an Alternative to the Conventional BATR Concept, 1992, 75 pgs.
PCT International Preliminary Report on Patentability in International Application No. PCT/US2017/030672, dated Nov. 6, 2018, 7 pages.
PCT International Preliminary Report on Patentability in International Application PCT/US2015/000499, dated Jul. 4, 2017, 9 pages.
PCT International Preliminary Report on Patentability in International Application PCT/US2015/067704, dated Jul. 4, 2017, 7 pages.
PCT International Preliminary Report on Patentability in International Application PCT/US2015/067923, dated Jul. 4, 2017, 7 pages.

(56) References Cited

OTHER PUBLICATIONS

PCT International Preliminary Report on Patentability in International Application PCT/US2017/030455, dated Nov. 6, 2018, 17 pages.
PCT International Preliminary Report on Patentability in International Application PCT/US2017/030457, dated Nov. 15, 2018, 15 pages.
PCT International Preliminary Report on Patentability in International Application PCT/US2017/030666 dated Nov. 6, 2018, 9 pages.
PCT International Search Report and Written Opinion in International Application No. PCT/US2017/030672, dated Sep. 27, 2017, 9 pages.
PCT International Search Report and Written Opinion in International Application PCT/US2015/000499, dated Jul. 22, 2016, 11 pages.
PCT International Search Report and Written Opinion in International Application PCT/US2015/067704, dated Apr. 28, 2016, 9 pages.
PCT International Search Report and Written Opinion in International Application PCT/US2015/067905 dated Aug. 5, 2016, 18 pages.
PCT International Search Report and Written Opinion in International Application PCT/US2015/067923, dated Apr. 19, 2016, 10 pages.
PCT International Search Report and Written Opinion in International Application PCT/US2017/030455, dated Jan. 30, 2018, 23 pages.
PCT International Search Report and Written Opinion in International Application PCT/US2017/030457, dated Jan. 23, 2018, 20 pages.
Reactor Start-up Procedure. Technical University Dresden. Reactor Training Course. pp. 3-4. <https://tu-dresden.de/ing/maschinenwesen/iet/wket/ressourcen/dateien/akr2/Lehrrnaterialien/start_e.pdf?lang=en>. (Mar. 2015), 21 pgs.
Scott, Ian and Durham John, The Simple Molten Salt Reactor, Practical, safe and cheap, Moltex Energy LLP presentation slides, 19 pgs.
Scott, Ian, Safer, cheaper nuclear: The simple molten salt reactor (Dec 2, 2014), http://www.ee.co.za/article/safer-cheaper-nuclear-simple-molten-salt-reactor.hlml, 10 pgs.
Takata et al., Conceptual Design Study on Fast Reactor Fuel Reprocessing System Using Super-Direx Process, pp. 5 (Apr. 25-29, 2004).
Taube, et al., Molten Plutonium Chlorides Fast Breeder Reactor Cooled by Molten Uranium Chloride, Annals of Nuclear Science and Engineering, vol. 1, pp. 277-281., 1974.
Thoma, R. E., "Chemical Aspects of MSRE Operations," ORNL-4658, Dec. 1971, 151 pages.
TransAtomic Power Technical White Paper, Mar. 2014, V1 .0.1., (2014), http://www.transatomicpower.com/, 34 pgs.
Van't Eind, R.J.S., Simulation of a Fast Molten Salt Reactor, PSR-131-2011-009, Jul. 2011, 68 pages.
Wai, C. M. and Shaofen Wang. "Supercritical fluid extraction: metals as complexes." Journal of chromatography A 785.1-2 (1997): 369-383.
Wang et al., "Extraction of Uranium from Aqueous Solutions by Using Ionic Liquid and Supercritical Carbon Dioxide in Conjunction" Chem. Eur. J. 15:4458-4463 (2009).
Xu et al., Thorium Energy R&D in China, THEO13, CERN, Oct. 28, 2013, 59 pgs.
Zhao et al., Review Use of ionic liquids as 'green' solvents for extractions, J Chem. Technol. Biotechnol. 80: 1089-1096 (2005), pp. 1089-1096 (2005).
Zhu et al., "Extraction of Actinides and Lanthanides by Supercritical Fluid" Journal of Engineering for Gas Turbines and Power 133:1-8 (May 2011).
PCT International Search Report and Written Opinion in International Application PCT/US2019/051345, dated Mar. 5, 2020, 15 pages.
Nang, Jun-Wei et al., "Influence of MgC12content on corrosion behavior of GH1140 in molten naCI-MgC12as thermal storage medium", Solar Energy Materials and Solar Cells, Elsevier Science Pub., Amsterdam, NL, vol. 179, Nov. 20, 2017, pp. 194-201.
Clarno, K.T. et al., "Trade studies for the liquid-salt-cooled very high-temperature reactor: fiscal year 2006 progress report", ORNL/TM-2006 140 (2007), 35 pgs.
Kimura, "Neutron spectrum in small iron pile surrounded by lead reflector", Journal of Nucear Science and Technology 15, No. 3 (1978): 183-191.

\* cited by examiner

NEUTRON REFLECTOR ASSEMBLY FOR DYNAMIC SPECTRUM SHIFTING

CROSS REFERENCE TO RELATED APPLICATIONS

The present application claim benefit of priority to U.S. Provisional Patent Application No. 62/337,235, entitled "NEUTRON REFLECTOR ASSEMBLY FOR DYNAMIC SPECTRUM SHIFTING" and filed on May 5, 2016, and to U.S. Provisional Patent Application No. 62/234,889, entitled "MOLTEN CHLORIDE FAST REACTOR AND FUEL" and filed on Sep. 30, 2015, both of which are specifically incorporated by reference for all that they disclose or teach.

BACKGROUND

A particular classification of fast nuclear reactor, referred to as a "breed-and-burn" fast reactor, includes a nuclear reactor capable of generating more fissile nuclear fuel than it consumes. That is, the neutron economy is high enough to breed more fissile nuclear fuel (e.g., plutonium-239) from fertile nuclear reactor fuel (e.g., uranium-238) than it burns in a fission reaction. In principle, a breed-and-burn reactor may approach an energy extraction rate of 100% of the fertile materials. To initiate the breeding process, a breed-and-burn reactor must first be fed with an amount of fissile fuel, such as enriched uranium. Thereafter, breed-and-burn reactors may be able to sustain energy production over a timespan of decades without requiring refueling and without the attendant proliferation risks of conventional nuclear reactors.

One type of breed-and-burn reactor is a molten salt reactor (MSR). Molten salt reactors are a class of fast spectrum nuclear fission reactors wherein the fuel is a molten salt fluid containing mixed or dissolved nuclear fuel, such as uranium or other fissionable elements. In an MSR system, the unmoderated, fast neutron spectrum provided by fuel salts enables good breed performance using the uranium-plutonium fuel cycle. In contrast to the fast spectrum neutrons that dominate breeding of fissile fuel from fertile fuel, thermal neutrons dominate the fission reaction of fissile fuel. A fission reaction resulting from a collision of a thermal neutron with a nuclide can consume the fissile fuel in a fission reaction, releasing fast spectrum neutrons, gamma rays, large amounts of heat energy and expelling fission products, such as smaller nuclei elements. Consuming nuclear fuel is referred to as burnup or fuel utilization. Higher burnup typically reduces the amount of nuclear waste remaining after the nuclear fission reaction terminates. The fast neutron spectrum also mitigates fission product poisoning to provide exceptional performance without online reprocessing and the attendant proliferation risks. The design and operating parameters (e.g., compact design, low pressures, high temperatures, high power density) of a breed-and-burn MSR, therefore, offer the potential for a cost-effective, globally-scalable solution to zero carbon energy.

SUMMARY

During operation of an MSR system, molten fuel salt exchange can allow some control over reactivity and breeding in the reactor core within desired operational bounds by altering the composition of the circulating molten fuel salt. In some implementations, the reactor core is wholly or partially enclosed in a neutron reflector assembly containing a neutron reflector material. The disclosed dynamic neutron reflector assembly allows additional dynamic and/or incremental control over reactivity and breed rate by adjusting reflectivity characteristics of a neutron reflector assembly to manage the neutron spectrum in the reactor core. Such control manages the reactivity and the breed rate in the reactor core. The composition of materials in the dynamic neutron reflector assembly may be altered by selectively inserting or removing neutron-spectrum-influencing materials, such as neutron reflectors, moderators or absorbers, to dynamically manage the dynamic neutron reflector assembly's neutron-spectrum-influencing characteristics ("reflectivity characteristics"). Alternatively, these reflectivity characteristics may be adjusted by varying the temperature, density, or volume of the material in the dynamic neutron reflector assembly. In some implementations, the dynamic neutron reflector assembly may include a flowing neutron reflector material that is in thermal contact with the fuel (e.g., molten fuel salt). The flowing neutron reflector material may be in any appropriate form including, without limitation, fluids like lead bismuth, slurry of suspended particulates, solids such as a powder, and/or pebbles such as carbon pebbles. The dynamic neutron reflector assembly may selectively circulate or flow through the assembly one or more neutron absorbing materials, such that it is possible to selectively add or remove reflector material therefrom. In other implementations, the flowing neutron reflector material can extract heat from the molten fuel salt in a heat exchanger via a primary or secondary coolant circuit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTIONS

Figure 1:
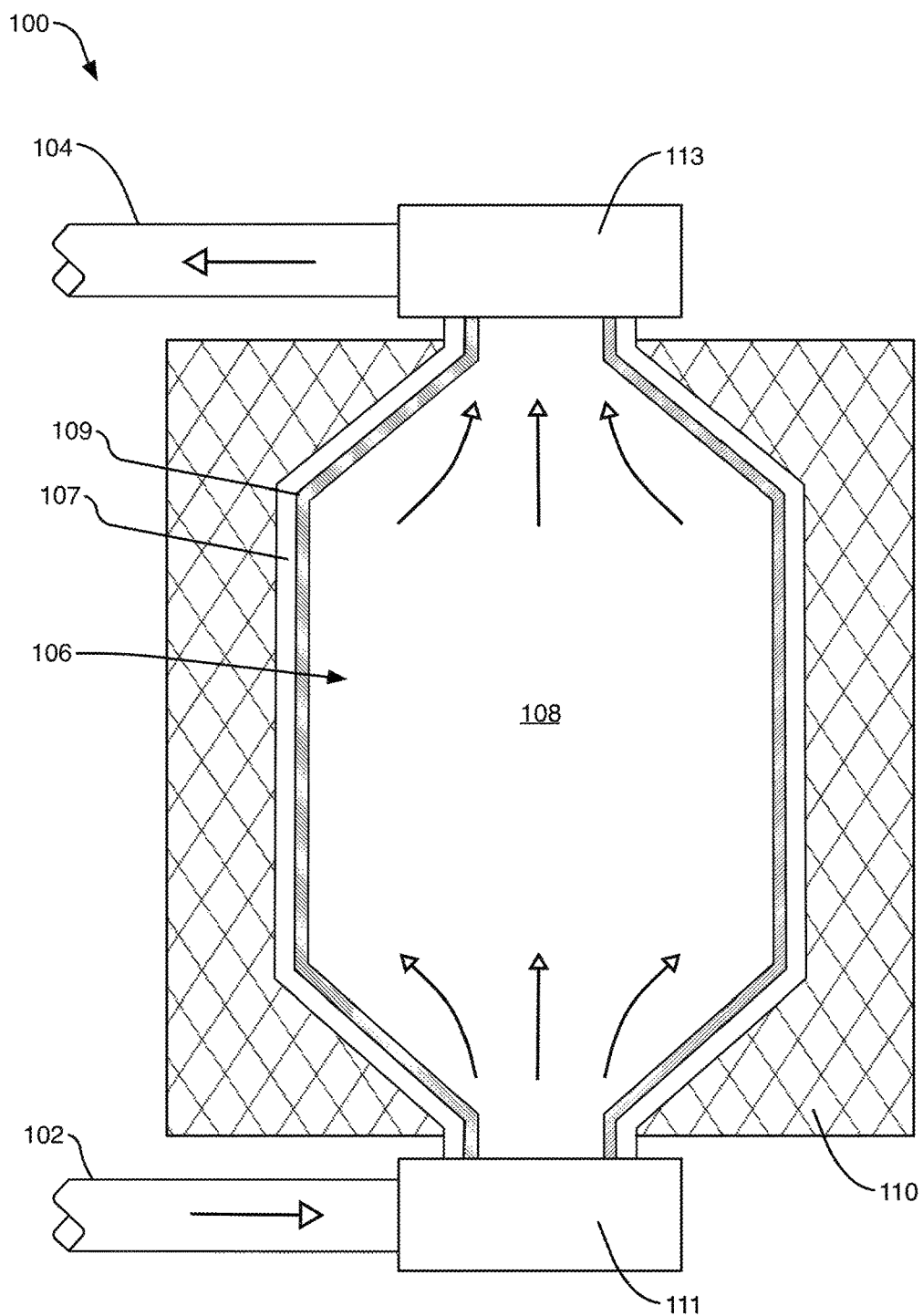
FIG. 1 depicts a schematic view of an example neutron reflector assembly on a molten fuel salt fast reactor system.

FIG. 1 is a schematic view of an example molten salt reactor (MSR) system 100 enabling an open breed-and-burn fuel cycle with fuel feed 102 and fuel outlet 104. The fuel outlet 104 flows molten fuel salt 108 from a reactor vessel 107 through a primary coolant loop to an external heat exchanger (not shown), which extracts heat (e.g., for use in a steam turbine) and cools the molten fuel salt 108 for return to the reactor vessel 107 via the fuel feed 102. The molten fuel salt 108 flows into the reactor vessel 107 through a molten fuel salt input 111 and flows out of the reactor vessel 107 through a molten fuel salt output 113.

The reactor core section 106 is enclosed by the reactor vessel 107, which may be formed from any material suitable for use in molten salt nuclear reactors. For example, the bulk portion of the reactor core section 106 may be formed from one or more molybdenum alloys, one or more zirconium alloys (e.g., Zircaloy), one or more niobium alloys, one or more nickel alloys (e.g., Hastelloy N) or high temperature steel and other similar materials. The internal surface 109 of the reactor core section 106 may be coated, plated or lined with one or more additional material in order to provide resistance to corrosion and/or radiation damage.

Reactor core section 106 is designed to maintain a flow of a molten fuel salt 108, wherein such flow is indicated by hollow tip thin arrows as in FIG. 1. In one implementation, the reactor vessel 107 enclosing the reactor core section 106 may have a circular cross-section when cut along a vertical or Z-axis (i.e., yielding a circular cross-section in the XY plane), although other cross-sectional shapes are contemplated including without limitation ellipsoidal cross-sections and polygonal cross-sections.

As part of the reactor startup operation, the MSR system 100 is loaded with an enriched fuel charge of initial molten fuel, such as uranium-233, uranium-235, or plutonium-239. In one implementation, uranium-235 is used as a startup fuel in the form of $UCl_4$, $UCl_3$, and/or $UF_6$ along with a carrier salt (e.g., NaCl, NaF, etc.). In one example, the initial molten fuel mixture contains enriched uranium at 12.5 w %, although other compositions may be employed. The initial molten fuel circulates through the reactor core section 106 of the MSR system 100, ignited by the criticality or reactivity of thermal neutrons of the enriched uranium. During operation, the initial molten fuel may be augmented by the breed-and-burn processes and by extraction and supplementation of molten fuel salt in varying compositions and amounts, in one approach, to managing the reactivity in the reactor core section 106.

A neutron reflector assembly 110 is disposed at or near the exterior of the reactor core section 106, such that the neutron reflector assembly 110 surrounds at least a portion of the nuclear fission region within the reactor core section 106. The neutron reflector assembly 110 may be designed in a single contiguous piece or may be composed of multiple segmented reflectors as explained in more detail below. The neutron reflector assembly 110 may be formed from and/or include any material suitable for neutron reflection, neutron moderation and/or neutron absorption, such as, for example, one or more of zirconium, steel, iron, graphite, beryllium, tungsten carbide, lead, lead-bismuth, etc.

Among other characteristics, the neutron reflector assembly 110 is suitable for reflecting neutrons emanating from the reactor core section 106 back into the molten fuel salt 108, according to dynamic incrementally adjustable reflectivity characteristics. One type of a dynamic incrementally adjustable reflection characteristic is neutron reflection, an elastic scattering of neutrons as they collide with reflector nuclei. Colliding neutrons are scattered at substantially the same energy with which they arrived but in a different direction. In this manner, a high percentage of fast spectrum neutrons can be reflected back into the reactor core section 106 as fast spectrum neutrons, where they can collide with fertile nuclear material to breed new fissile nuclear material. Accordingly, neutron reflector material in the neutron reflector assembly 110 can enhance the breed operation of a breed-and-burn fast reactor.

Additionally, or alternatively, another dynamically adjustable reflection characteristic is neutron moderation, an inelastic scattering of neutrons as they collide with moderator nuclei. Colliding neutrons are scattered at a lower energy than that with which they arrived (e.g., a fast spectrum neutron scatters as a thermal spectrum neutron) and with a different direction. In this manner, a high percentage of fast spectrum neutrons can be reflected back into the reactor core section 106 as thermal neutrons, where they can collide with fissile nuclear material and result in a fission reaction. Accordingly, neutron moderator material in the neutron reflector assembly 110 can enhance the burn-up operation of a breed-and-burn fast reactor.

Additionally or alternatively, another dynamically adjustable reflection characteristic is neutron absorption, also known as neutron capture: a nuclear reaction in which an atomic nucleus and one or more neutrons collide and merge to form a heavier nucleus. Absorbed neutrons are not scattered but remain part of the merged nuclei unless released at a later time, such as part of a beta particle. Neutron absorption provides the reflectivity characteristic of zero or minimal reflection. In this manner, fast and thermal neutrons emanating from the reactor core may be prevented from scattering back into the reactor core section 106 to collide with fissile or fertile material. Accordingly, neutron absorbing material in the neutron reflector assembly 110 can diminish the breed operation and burn operation of a breed-and-burn fast reactor.

Dynamic control over neutron reflectivity characteristics of the neutron reflection assembly 110 permits selection of a desired reactivity level in reactor core section 106. For example, molten fuel salt 108 requires a minimum level of thermal neutron contact to remain critical in reactor core section 106. The dynamic neutron reflector assembly 110 may be adjusted to provide the reflectivity characteristics for maintaining or contributing to the criticality in the molten fuel salt 108 within the reactor core section 106. As another example, it may be desired to operate the MSR system 100 at full power, which would motivate an increased thermalization of neutrons in the reactor core section 106 to increase the fission rate. The reflectivity characteristics of dynamic neutron reflector assembly 110 could be therefore increased to provide more moderation until a desired reactivity level representing full power for the reactor core section 106 has been reached.

In contrast, as MSR system 100 is a breed-and-burn reactor, it may be desired to dynamically control breed rate at various points over the lifecycle of the reactor. For example, early in the reactor's lifecycle, a high breed rate may be desired to increase the availability of fissile material in reactor core section 106. The reflectivity characteristics of dynamic neutron reflector 110 may therefore be adjusted to provide increased reflection of fast neutrons into reactor core section 106 to breed more fertile material into fissile fuel. As more fast neutrons are reflected into reactor core section 106 over time, the fast neutrons may breed fertile material into fissile material until a desired concentration of fissile material has been reached. Later in the reactor's lifecycle, it may be desirable to increase burnup to provide increased power through increased burnup. The reflectivity characteristics of dynamic neutron reflector assembly 110 may therefore be adjusted to increase moderation of fast neutrons into thermal neutrons to maintain the desired burn rate.

In this way, the core reactivity and the ratio of breeding to burning may be accurately controlled over time by adjusting the reflectivity characteristics of dynamic neutron reflector assembly 110. For example, an operator of the MSR system 100 may wish to maintain a high and consistent burn profile over time. In some implementations, a desired burn profile is a burn profile that remains near maximum burn rate of the MSR system 100 over an extended period of time, such as over a period of years or decades. Reflectivity characteristics of dynamic neutron reflector assembly 110 may be chosen at various intervals over the extended period of time to obtain such a burn profile. As in the example above, early in the life cycle of the MSR system 100, reflectivity characteristics may be chosen to reflect more fast neutrons into reactor core section 106 to breed fertile material into fissile material until a desired concentration of fissile material has been reached. Reflectivity characteristics may be again adjusted for increased thermalization appropriate to the concentration of fissile material. Over time, as the fissile material is burned, reflectivity characteristics of dynamic neutron reflector assembly 110 may again be adjusted to introduce more breeding through fast neutron reflection, by reducing moderation and/or increasing fast neutron reflection. These adjustments may continue such that the burn profile of MSR system 100 remains high, and fertile material is bred into fissile material at a rate sufficient to supply the MSR system 100 with fuel over the extended period.

Figure 2:
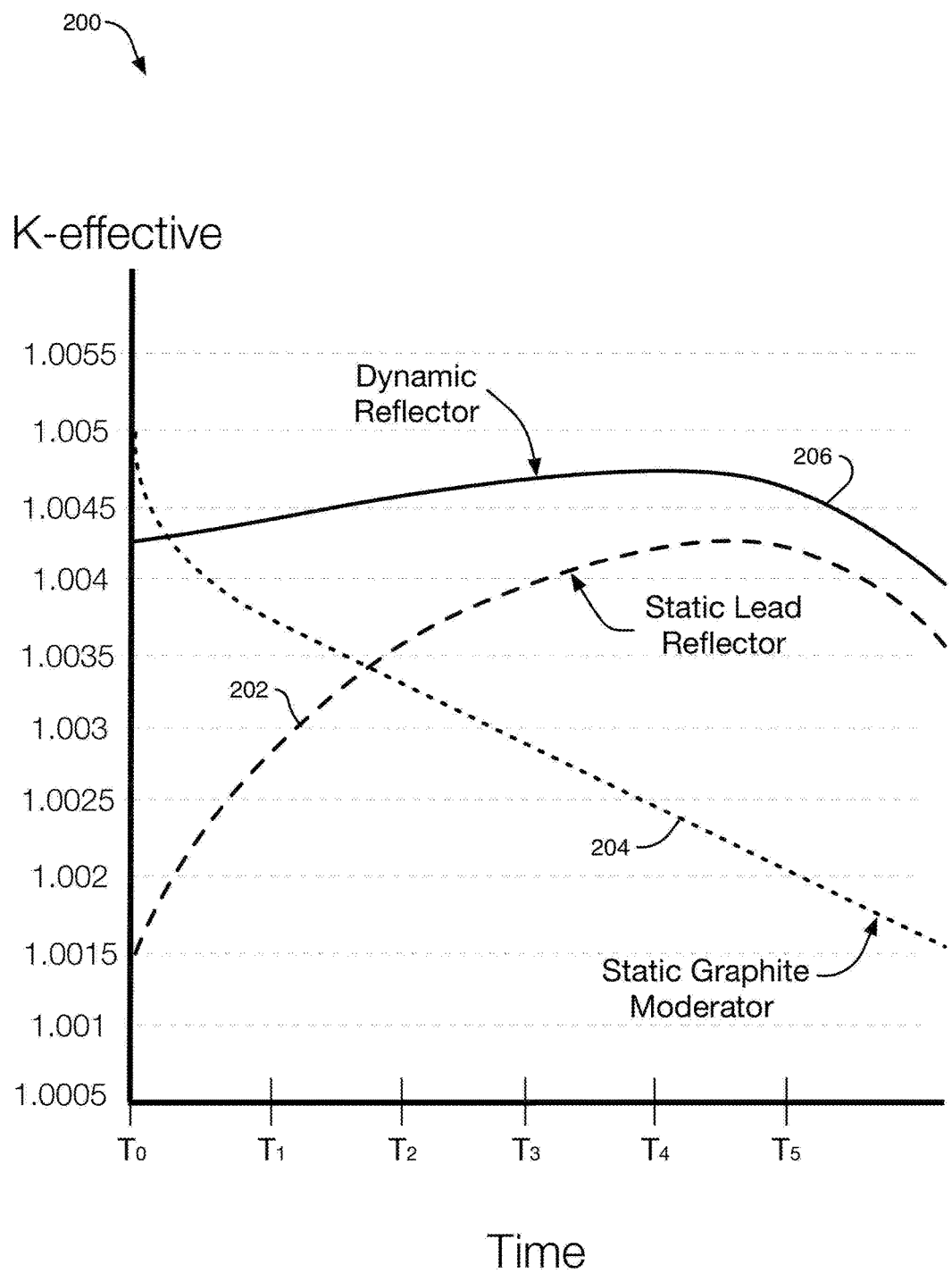
FIG. 2 depicts a plot of reflectivity against time in a fast spectrum molten salt reactor of one or more example dynamic neutron reflector assemblies against other neutron reflector assembly configurations.

FIG. 2 is a plot 200 of reactivity against time of a fast spectrum MSR with one or more dynamic reflector assemblies against two other assembly configurations with static neutron influencing characteristics. A plot line 202 shows reactivity over time for a fast spectrum MSR reactor with static lead neutron reflector assembly surrounding a reactor core, wherein the lead neutron reflector assembly tends to elastically scatter fast neutrons into the reactor core. After a time $T_0$, when the reactor is started with an initial fuel charge, breeding of fertile fuel may occur rapidly due to reflection of fast neutrons into the reactor core. After $T_1$, reactivity on the plot line 202 gradually increases over time as the breeding increases the amount of available fissile material to burn, reaching a maximum at a time near $T_4$. Breeding may slow over time with increasing burnup as fertile fuel previously present in the reactor core is converted to fissile material or fissioned due to increased competition for neutrons with products of fission. The plot line 202 does not show a constant reactivity level over time because, near the beginning of the period, there are not sufficient fast neutrons in the fuel region to breed enough fissile material to support a high burn rate. Over time, the larger number of fast neutrons breeds fertile material into fissile material, and reactivity increases but remains below the maximum burn rate of which the reactor is capable. Near the end of the period, around time $T_5$, reactivity reaches a local maximum and begins to decline as the supply of fertile material begins to decline.

A plot line 204 shows reactivity over time for a fast MSR with a static graphite moderator configuration, wherein the moderating neutron reflector assembly tends to provision the reactor core with thermalized neutrons. On the plot line 204, reactivity begins around time $T_0$ at a relatively higher level than plot line 202 due in part to thermalization caused by the graphite moderator increasing the probability of fission. Plot line 204 may drop significantly near time $T_0$ due to thermal spectrum multiplication adjacent to the graphite reflector. Reactivity may then gradually reduce over time in a generally linear manner as the thermal neutrons burn fissile fuel in the reactor core. The plot line 204 is similar to plot line 202 in the respect that neither plot line reaches or maintains a maximized burn rate achievable within the reactor core. The plot line 204 does not reach the reactor's maximum burn rate because there are not enough fast neutrons to maintain a breeding rate high enough to support the burn rate as time progresses though the period $T_0$-$T_5$. In the plot lines 202 and 204, the burn rate is not optimized over the time period $T_0$-$T_5$. Instead, each plot has a period of relatively higher burn rate and a period of relatively lower burn rate over the course of the graph.

The plot lines 202 and 204 are shown in contrast to plot line 206. The plot line 206 illustrates reactivity over time for a fast MSR system with a dynamic neutron reflector assembly, starting with a high moderator configuration and changing to a high reflector configuration, thereafter being dynamically controlled to achieve desired reactivity conditions within the reactor core. Reactivity over time on the plot line 206 starts relatively high after an initial fuel charge is loaded around time $T_0$, and remains high due to the dynamically controllable nature of the reflection and thermalization of neutrons. Around time $T_0$, the composition of material in the neutron reflection assembly is adjusted for a moderation rate that correlates with the concentration of fissile material available in the fuel region at that time. As the burn up progresses, the composition of material in the neutron reflection assembly is adjusted to increase fast neutron reflection and decrease moderation to continue supplying the fuel region with newly bred fissile material while, at the same time, maintaining an appropriate amount of thermalization to match the current conditions in the fuel region. The adjustments may be performed continuously or as a batch process, and continue over time towards $T_5$. An effect of these dynamic neutron reflector assembly adjustments is to maintain a relatively stable and high reactivity rate over the entire period $T_0$-$T_5$ that is not feasible with static moderators and neutron reflectors, such as those represented by the plot lines 202 and 204, respectively. Nevertheless, the same dynamic neutron reflector assembly may be used to control reactivity in other ways (e.g., to reduce reactivity, etc.).

It should also be noted that inclusion of a neutron absorber within the neutron reflector assembly can also impact the reactivity within the reactor core. Dynamic adjustments among neutron reflector, moderator, and absorber materials within the neutron reflector assembly can provide richer control options than static neutron reflector assemblies alone.

Figure 3:
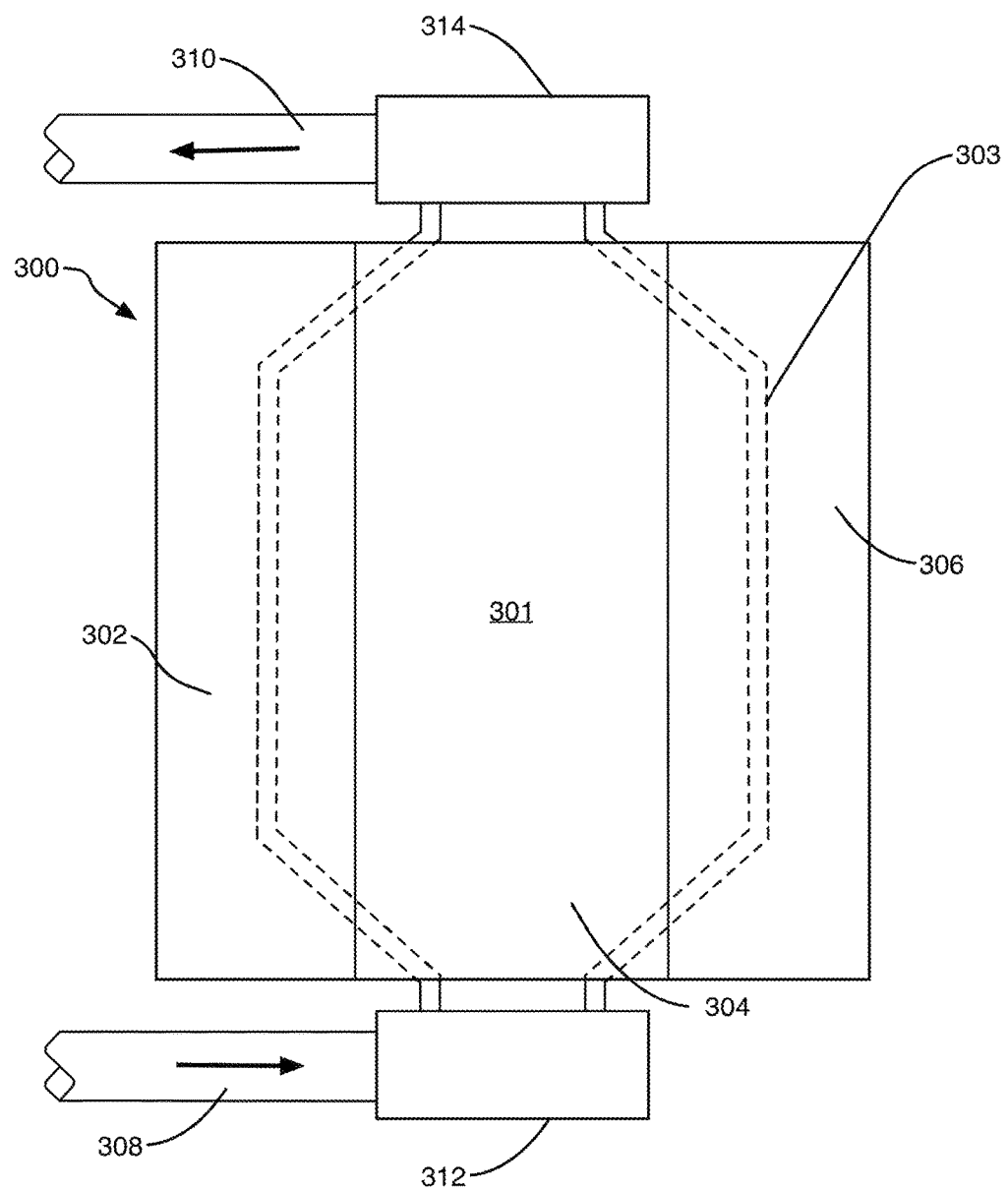
FIG. 3 depicts a schematic view of an example segmented neutron reflector assembly surrounding a molten nuclear fuel salt fast reactor.

FIG. 3 is a schematic view of a segmented dynamic neutron reflector assembly 300 surrounding an MSR core 301. The MSR core 301 is equipped with a fuel feed 308 and a fuel outlet 310. The fuel outlet 310 flows molten fuel salt from a reactor vessel 303 through a primary coolant loop to an external heat exchanger (not shown), which extracts heat (e.g., for use in a steam turbine) and cools the molten fuel salt for return to the reactor vessel 303 via the fuel feed 308. The molten fuel salt flows into the reactor vessel 303 through a molten fuel salt input 312 and flows out of the reactor vessel 303 through a molten fuel salt output 314.

Segmented dynamic neutron reflector 300 may partially or substantially surround the MSR core 301. For example, there may be gaps between the segments 302, 304, 306 or the segments 302, 304, 306 may encircle the MSR core contiguously. Although three segments of the dynamic reflector assembly 300 are shown in FIG. 3, it should be understood that the dynamic reflector assembly may comprise any number of segments. The segments of the dynamic reflector assembly 300 may surround the core by completely or partially encircling the core radially. Segments of the dynamic reflector assembly 300 may be optionally positioned above and/or below the reactor core in combination with, or instead of, radial reflector segments.

It should be understood that in some cases it may not be possible for the segmented dynamic neutron reflector to completely surround the reactor core in an uninterrupted or completely contiguous manner. For example, it may be appropriate to dispose various structures and instruments around the fast MSR core 301 with supporting elements such as input/output piping, power supply conduits, data conduits, and/or other instrumentation, controls, and supporting hardware. These structures and instruments may require direct or indirect access to the reactor core such that the segments of the dynamic reflector assembly 300 may need to be shaped or positioned to accommodate access. Accordingly, in some implementations, it may be appropriate to permit gaps between the segments or arrangements wherein portions of the area surrounding the reactor core are not covered by segments of the dynamic reflector assembly 300.

Some or each segment 302, 304, 306 of the dynamic reflector assembly 300 may contain one or more channels (not shown in FIG. 3) for conducting a flowing reflector material. As used in this application, the term channels refers not only to a tubular enclosed passage, but to any volume suitable for flowing a reflector material. A flowing reflector material may include materials that may not necessarily be fluids, but materials that can circulate or flow through the assembly, such that it is possible to selectively add or remove reflector material therefrom. Examples of suitable neutron reflector materials include fluids, slurry of suspended particulates, and/or solids such as a powder, and/or pebbles, such as carbon pebbles, etc. The segments 302, 304, 306 may contain one or more first channels for conducting a flowing reflector material in a first direction, such as, for example, down along the periphery of the respective segments, and one or more second channels for conducting a flowing reflector material in a second direction, such as, for example, back up to the top of dynamic neutron reflector assembly 300. The channels of the various reflector segments may be fluidically coupled such that the flowing neutron reflector material flows between the segments. In another implementation, the reflector segments may be fluidically separate from one another such that flowing reflector material flows into and out of only a single segment.

In an implementation, one or more of the fluid channels in the reflector segments may be in thermal communication with a heat exchanger and/or the molten fuel salt, acting as a coolant. The flowing reflector material may thus exchange heat with the molten fuel salt, and transfer the heat via the heat exchangers to a secondary coolant circuit to supply heat from the reactor to a turbine or other electricity generating equipment. As the flowing reflector material exchanges heat with the reactor core through a primary and/or a secondary coolant circuit, the flowing reflector material temperature may fluctuate. As the flowing reflector material's temperature fluctuates, its density may vary. For example, in an implementation, the flowing reflector material is molten lead-bismuth, and the molten lead-bismuth will experience a higher density at lower temperatures. As the temperature of the molten lead-bismuth lowers and its density rises, the number of molecules per unit volume of the lead-bismuth will increase. As the number of molecules per unit volume increases (i.e., higher density), the likelihood of reflecting a fast spectrum neutron emanating from the reactor core increases, thus increasing the effective reflectivity of the flowing reflector material without changing the volume of the material. In another implementation, the density of the flowing reflector material may be adjusted by introducing a non-reflective material (such as non-reflective material particulates, fluids gas bubbles, etc.) into the flowing reflector material. In yet another implementation, the density of the flowing reflector material may be adjusted by adjusting environmental characteristics to vaporize the flowing reflector material into a low density vapor phase. In this way, the material composition of the dynamic neutron reflector assemblies, and thus its reflectivity, may be altered.

Figure 4:
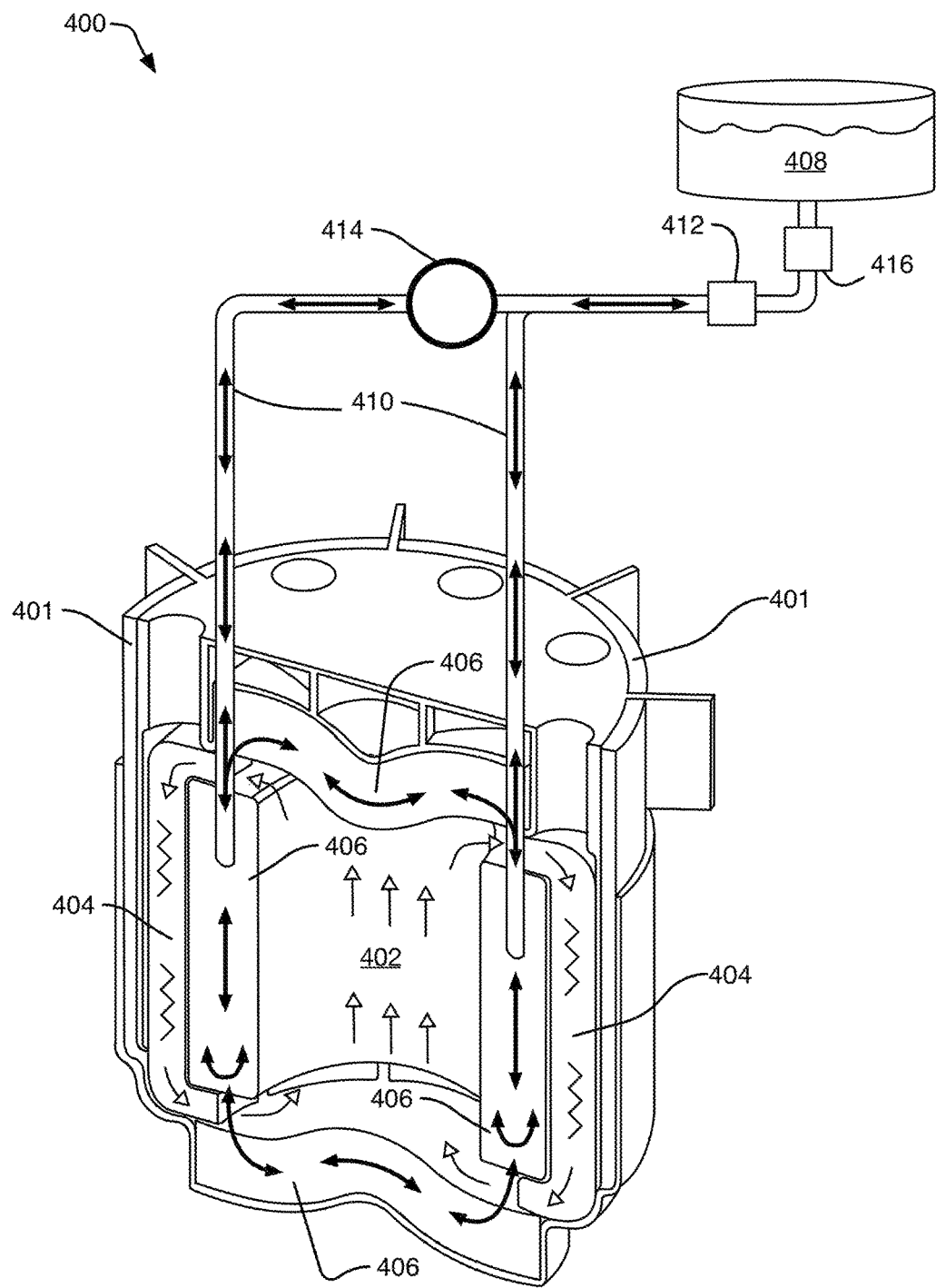
FIG. 4 illustrates an example molten salt fuel nuclear reactor with a neutron reflector assembly equipped with an overflow tank.

FIG. 4 illustrates an MSR system 400 with a dynamic flowing neutron reflector assembly 406 equipped with a spillover reservoir 408. A molten fuel salt 402 flows in an upward direction as it is heated by the fission reaction in the internal central reactor core section and flows downward as it cools around the internal periphery of the reactor vessel 401. In FIG. 4, hollow tip arrows indicate the flow of molten fuel salt through MSR system 400. The constituent components of the molten fuel may be well-mixed by the fast fuel circulation flow (e.g., one full circulation loop per second). In one implementation, one or more heat exchangers 404 are positioned at the internal periphery of the reactor vessel 401 to extract heat from the molten fuel flow, further cooling the downward flow, although heat exchangers may additionally or alternatively be positioned outside the reactor vessel 401.

MSR system 400 includes dynamic neutron reflector assemblies 406. Operating temperatures of MSR system 400 may be high enough to liquefy a variety of suitable neutron reflector materials. For example, lead and lead-bismuth melt at approximately 327° C. and 200° C., respectively, temperatures within the operating range of the reactor. In an implementation, dynamic neutron reflector assemblies 406 are configured to contain a flowing and/or circulating fluid-phase of the selected neutron reflector materials (e.g., lead, lead-bismuth, etc.). In FIG. 4, solid tip arrows indicate the flow of neutron reflector material. Dynamic neutron reflector assemblies 406 may be formed from any suitable temperature and radiation resistant material, such as from one or more refractory alloys, including without limitation one or more nickel alloys, molybdenum alloys (e.g., a TZM alloy), tungsten alloys, tantalum alloys, niobium alloys, rhenium alloys, silicon carbide, or one or more other carbides. In an implementation, dynamic neutron reflector assemblies 406 are positioned on, and distributed across, the external surface of the reactor core section. In implementations, the dynamic neutron reflector assemblies 406 may be segmented, as explained above with reference to FIG. 3. In an implementation, dynamic neutron reflector assemblies 406 are arranged radially across the external surface of the reactor core section. Dynamic neutron reflector assemblies 406 may be arranged to form a contiguous volume of neutron reflector material around the reactor core section. Any geometrical arrangement and number of dynamic neutron reflector assemblies 406 is suitable for the technology described herein. For example, dynamic neutron reflector assemblies 406 may be arranged in a stacked ring configuration, with each module filled with a flow of neutron reflector material to form a cylindrical neutron reflecting volume around the reactor core section. Dynamic neutron reflector assemblies 406 may also be arranged above and below the reactor core section.

The composition of the dynamic neutron reflector assemblies 406 may be adjusted to change reflectivity characteristics, such as, for example, by adjusting the volume of the flowing reflector material in reflectors 406. One way of adjusting the volume of the flowing reflector material in reflectors 406 is to pump the material into or out of dynamic reflectors 406 into spillover reservoir 408 via piping assembly 410 and pump 414. To decrease the volume of the flowing neutron reflector material, and thus to decrease the reflectivity characteristics of reflectors 406, a portion of the flowing neutron reflector material may be pumped or displaced into spillover reservoir 408 via piping assembly 410. A valve 412 and pump 414 may cooperate to regulate the flow of the flowing neutron reflector material through piping assembly 410. To increase the volume of the flowing neutron reflector material, valve 412 and pump 414 may cooperate to flow the flowing neutron reflector material out of overflow tank 408 and back into reflectors 406 via piping assembly 410. In another implementation, the reflectivity of dynamic neutron reflector assemblies 406 may be adjusted by regulating the temperature, and thus the density, of the flowing neutron reflector material. Changes in the density of the flowing neutron reflector material alter its neutron reflective characteristics as denser materials have a higher mass per unit volume. Denser materials will contain more molecules per unit volume, and are therefore more likely to reflect neutrons because any neutron travelling through the denser material will be more likely to strike a molecule of the flowing neutron reflector material and thus be reflected. Pump 414 and valve 412 may cooperate to increase or decrease the flow rate of the flowing neutron reflector material into or out of dynamic neutron reflectors 406 to regulate the temperature of the reflecting flowing neutron reflector material. In other implementations, spillover reservoir 408 may be replaced with other configurations, such as a closed circuit loop.

The MSR system 400 may include a flowing neutron reflector material cleaning assembly 416. The flowing neutron reflector material cleaning assembly 416 is in fluid communication with the piping assembly 410, and may be located on either side of valve 412 and pump 414. The flowing neutron reflector material cleaning assembly 416 may filter and/or control the chemistry of the neutron reflector material. For example, the flowing neutron reflector cleaning assembly 416 may remove oxygen, nitrites, and other impurities from the neutron reflector material. In an implementation, a zircon nitrite coating in the neutron reflector cleaning assembly 416 is configured to control the chemistry of the flowing neutron reflector material. In another implementation, the flowing neutron reflector cleaning assembly 416 may perform a "slagging" technique wherein the flowing neutron reflector cleaning assembly 416 captures oxygen as an oxide material. If the oxide material is molten, it may phase separate and the flowing neutron reflector cleaning assembly 416 may remove the oxide material from the neutron reflector material by, for example, scraping the oxide material. In another implementation, the flowing neutron reflector cleaning assembly 416 is configured for a hydrogen treatment of the neutron reflector material to remove oxygen contained therein.

The composition of dynamic neutron reflectors 406 may also be adjusted by introducing a flowing moderator material. The flowing moderator material may be held in a reserve tank (not shown) and introduced into dynamic neutron reflectors 406 via piping assembly 410 and pump 414 in fluid communication with the fluid moderator reserve tank. The flowing moderator material may circulate in dynamic reflectors 406, and may be removed by pump 414 into the reserve tank via piping assembly 410. In an implementation, water or heavy water may be used as a flowing moderating liquid in dynamic neutron reflectors 406. In another implementation, beryllium may be used as a flowing moderating material in dynamic neutron reflectors 406. In yet another implementation, LiF—BeF2 may be used a flowing moderating material in dynamic neutron reflectors 406 and/or in the fuel salt itself. The pump 414 may pump the flowing moderator liquid and/or the flowing neutron reflector material into and out of the dynamic reflectors 406 continuously and/or in a batch process.

As previously described, neutron absorbing material can also be incorporated into dynamic neutron reflector assemblies 406, individually or in combination with various compositions and/or configurations of neutron reflector materials and neutron moderator materials.

Figure 5:
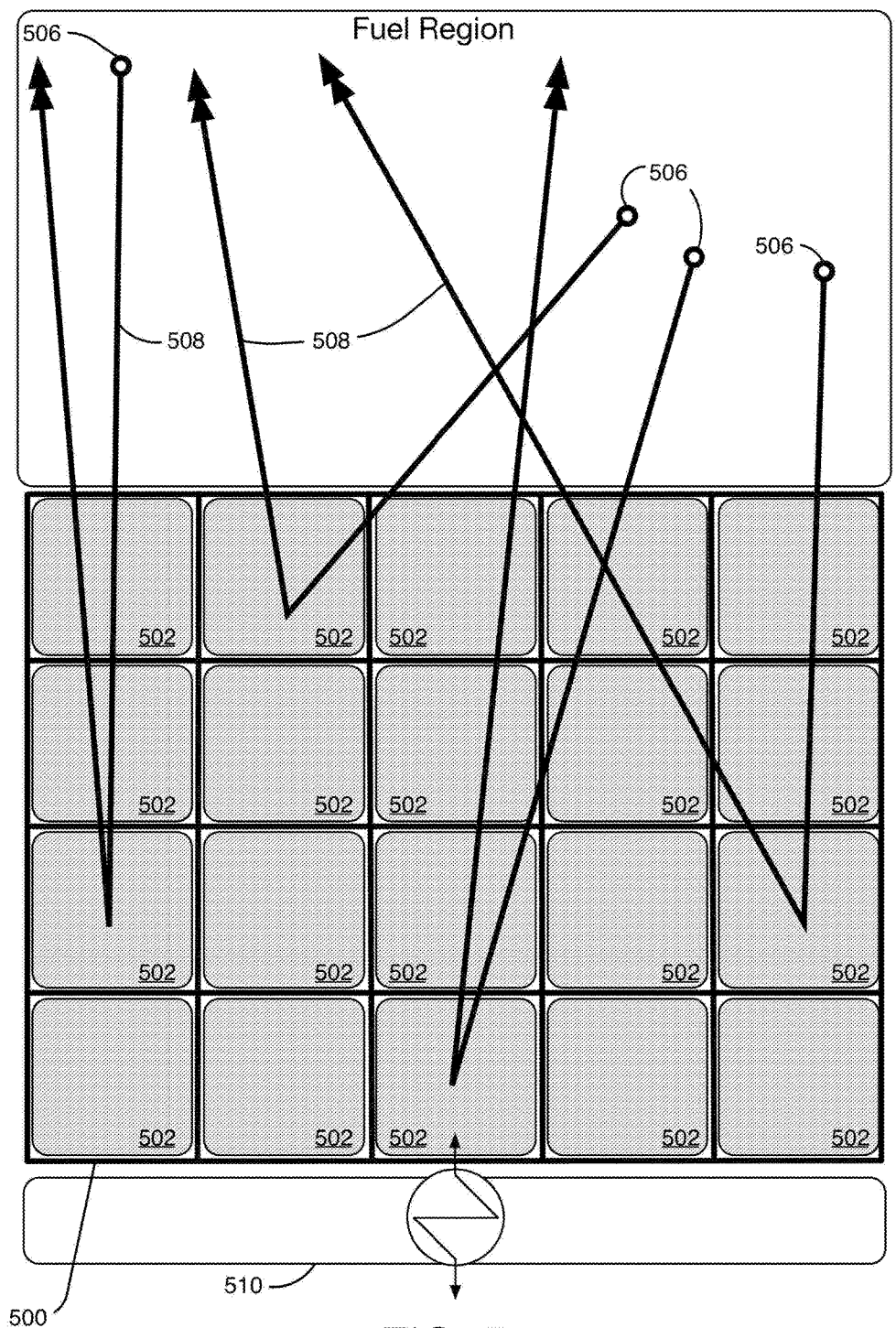
FIG. 5 depicts a top-down view schematic view of an example neutron reflector assembly with a plurality of sleeves.

FIG. 5 is a top-down schematic view of a dynamic neutron reflector assembly 500 with a plurality of refractory clad sleeves 502 to conduct a flowing neutron reflector material therethrough. In an implementation, flowing neutron reflector assembly 500 substantially surrounds a nuclear fuel region 504 from which fast spectrum neutrons 506 emanate. In FIG. 5, example paths of fast spectrum neutrons 506 are indicated by lines terminating in double arrows, such as lines 508. The example fast spectrum neutrons 506 are inelastically scattered (or reflected) from the flowing reflector material and back into the nuclear fuel region 504. The reflector configuration of FIG. 5 may be used to incrementally shift neutron spectrum in nuclear fuel region 504 by selectively filling each of the channels 502 with a volume of neutron reflector material.

In FIG. 5, the neutron reflector material flows upward through a refractory clad channel 502 toward the viewer. In an implementation, neutron reflector material may circulate in channels 502 (e.g., cells, sleeves, conduits, etc.) with input and output ports above the nuclear fuel region 504 such that no fixtures or ports are needed beneath the reactor. In other implementations, the neutron reflector material may flow in only one direction, either in an upward or downward direction, through the channels 502 with one port above the nuclear fuel region 504 and another port below fuel region 504. In yet other implementations, the neutron reflector material may comprise a semi-stagnant or creeping flow through the channels 502. In yet other implementations, the neutron reflector material may flow through radial input and output ports.

The dynamic neutron reflector assembly 500 is in thermal communication with heat exchanger 510 disposed on the opposite side from fuel region 504. The heat exchanger 510 may contain one or more types of liquid coolant circulating therethrough. As neutron reflector 500 exchanges heat with the heat exchanger 510, the heat exchanger 510 may transport the heat away from the dynamic neutron reflector assembly 500 as part of a secondary coolant circuit. The secondary coolant circuit may supply heat to electricity generation equipment, such as, for example, a steam-driven turbine. In an implementation, molten fuel salt may flow upward through the nuclear fuel region 504 and downward through the heat exchanger 510, thus exchanging heat as part of a primary coolant circuit. In other words, the heat exchangers may exchange heat with both the molten fuel salt and exchange heat with the flowing neutron reflector in the channels 502. The flow rate of neutron reflector material may be adjusted to vary contact time with the heat exchangers to vary the temperature of reflector material flowing in the channels 502. As the temperature of reflector material varies, its density changes accordingly. Changes in the density of the reflector material alter its neutron reflective characteristics as denser materials have a higher mass per unit volume and are therefore more likely to reflect neutrons. The channels 502 may be formed in geometric shapes including without limitation square, rectangular, round, circular, polygonal, etc.

Figure 6:
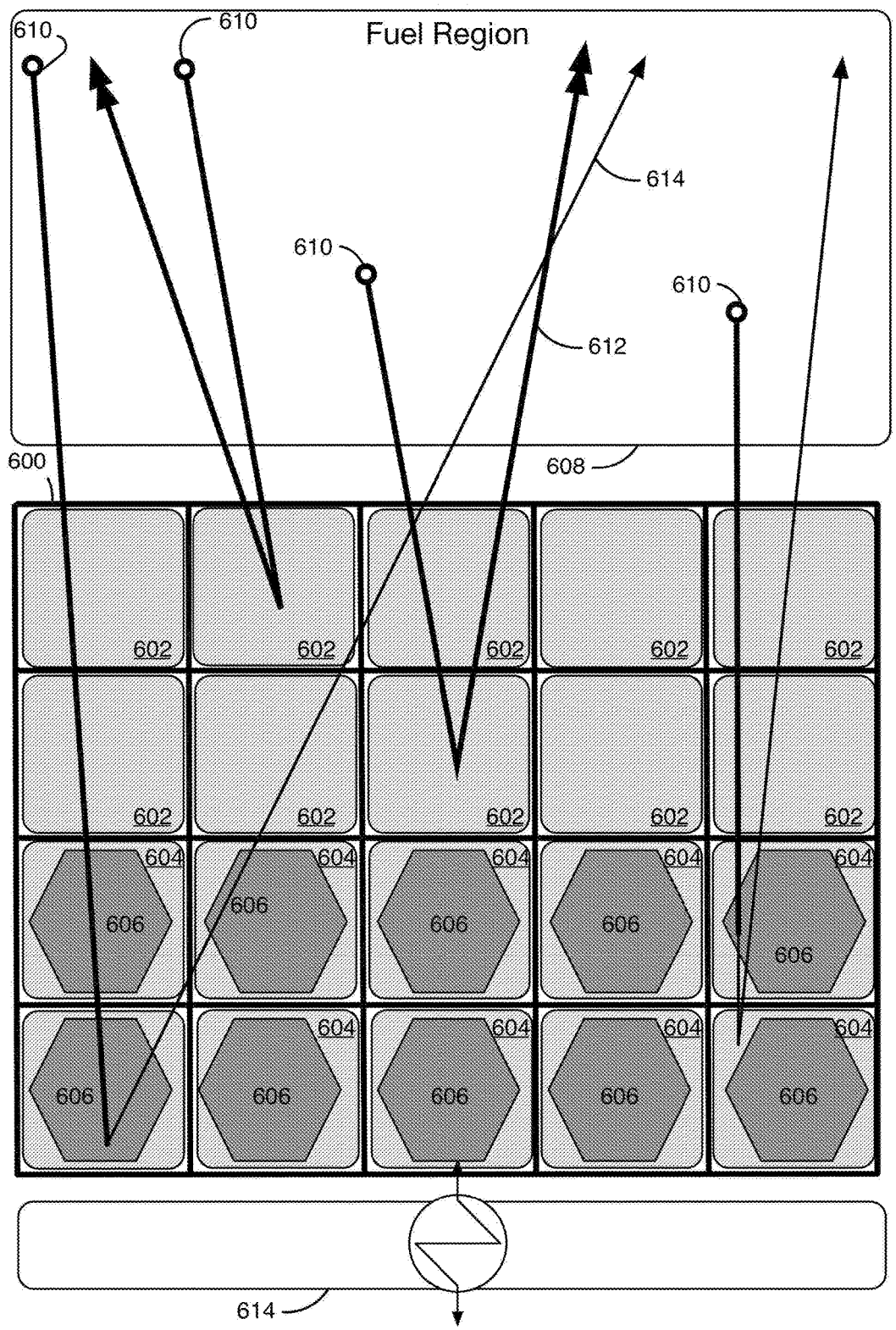
FIG. 6 depicts a top-down schematic view of an example neutron reflector assembly with a plurality of sleeves including neutron moderating members.

FIG. 6 is a top-down schematic view of a dynamic neutron reflector assembly 600 with a plurality of sleeves 602 conducting a flowing neutron reflector material and a plurality of sleeves 604 including neutron moderating members 606 selectively inserted into sleeves 602, 604 in any desired configuration with respect to which and how many sleeves 602 may receive a neutron moderating member 606. Dynamic neutron reflector assembly 600 substantially surrounds a fuel region 608 from which fast spectrum neutrons 610 emanate. In FIG. 6, lines terminating in double arrows such as lines 612 indicate fast spectrum neutrons. Upon insertion, neutron moderating members 606 displace a volume of flowing neutron reflector material, thus altering the neutron reflectivity characteristics of dynamic neutron reflection assembly 600. Since dynamic neutron reflector assembly 600 contains neutron reflecting and neutron moderating materials, some of the fast spectrum neutrons are reflected back into fuel region 608, and other fast spectrum neutrons 610 strike neutron moderating members 606 and are converted into thermal neutrons.

In FIG. 6, example paths of thermal neutrons are indicated by lines terminating in single arrows, such as line 614. Example paths of fast spectrum neutrons are indicated by lines terminating in double arrows. As dynamic reflector assembly 600 converts fast spectrum neutrons into thermal neutrons, the thermal neutrons may be reflected back into fuel region 608 by the flowing neutron reflector material in the channels 602, 604, or reflected by another neutron reflector disposed behind dynamic reflector 600 (not shown). By displacing some of the volume of flowing neutron reflector material, the overall reflectivity characteristics of reflector 600 are changed, thus reducing the breed rate in fuel region 608 due to a reduced reflection of fast spectrum neutrons compared to a configuration without neutron moderating volumetric displacement members 606. The displacement member configuration shown in FIG. 6 also increases the burn rate in fuel region 608 due to an increase in thermal spectrum neutrons compared to a configuration without displacement members. By selectively inserting neutron moderating volumetric displacement members 606 into reflector 600, the breed and burn rates, as well as the neutron spectrum, in fuel region 608 may be dynamically adjusted. The volumetric displacement members 606 may be formed in geometric shapes including without limitation square, round, rectangular, circular, polygonal, etc.

In an embodiment, the overall reflectivity characteristics of the reflector 600 are changed by draining one or more of the channels 602, 604 of the flowing neutron reflector material, thus leaving empty space in one or more of the channels 602, 604. Active cooling can be provided to the reflector 600 can provide active cooling by providing thermal communication with the fuel salt and/or with a secondary coolant.

In FIG. 6, the neutron reflector material flowing in channels 602 flows upward toward the viewer. In an implementation, neutron reflector material flowing in channels 602 may circulate in channels 602 with input and output ports above fuel region 608 such that no fixtures or ports are needed beneath the reactor. In other implementations, neutron reflector material flowing in channels 602 may flow in only one direction, either in an upward or downward direction, through channels 602 with one port above fuel region 608 and another port below fuel region 608. In yet other implementations, the neutron reflector material may comprise a semi-stagnant or creeping flow through channels 602. In yet other implementations, the neutron reflector material may flow through radial input and output ports.

Heat exchanger 614 may be in thermal communication with dynamic reflection assembly 600 for exchanging heat from fuel region 608. In an implementation, the heat exchanger 614 is disposed adjacent on the opposite side of dynamic reflector assembly 600 from fuel region 608. As the neutron reflector material flows through the sleeves of dynamic reflector assembly 600, it may transfer heat emanating from fuel region 608 to the heat exchanger 614 to form a secondary coolant circuit. The secondary coolant circuit may include one or more secondary coolant loops formed from piping. The secondary coolant circuit may include any secondary coolant system arrangement known in the art to be suitable for implementation in a molten fuel salt reactor. The secondary coolant system may circulate a secondary coolant through one or more pipes and/or fluid transfer assemblies of the one or more secondary coolant looks in order to transfer heat generated by the reactor core and received by the heat exchanger 614 to downstream thermally driven electrical generation devices and systems. The secondary coolant system may include multiple parallel secondary coolant loops (e.g., 2-5 parallel loops), each carrying a selected portion of the secondary coolant through the secondary coolant circuit. The secondary coolant may include, but is not limited to, liquid sodium.

In an implementation, the heat exchanger 614 is protected by one or more materials effective as a poison or neutron absorber to capture neutrons emanating from the fuel region 608 before the neutrons interact with, and cause radiation damage to, the heat exchanger 614. In an implementation, the heat exchanger 614 includes the one or more materials effective as a poison or neutron absorber. In another implementation, the one or more materials effective as a poison or neutron absorber are included in the dynamic reflector assembly 600.

Figure 7:
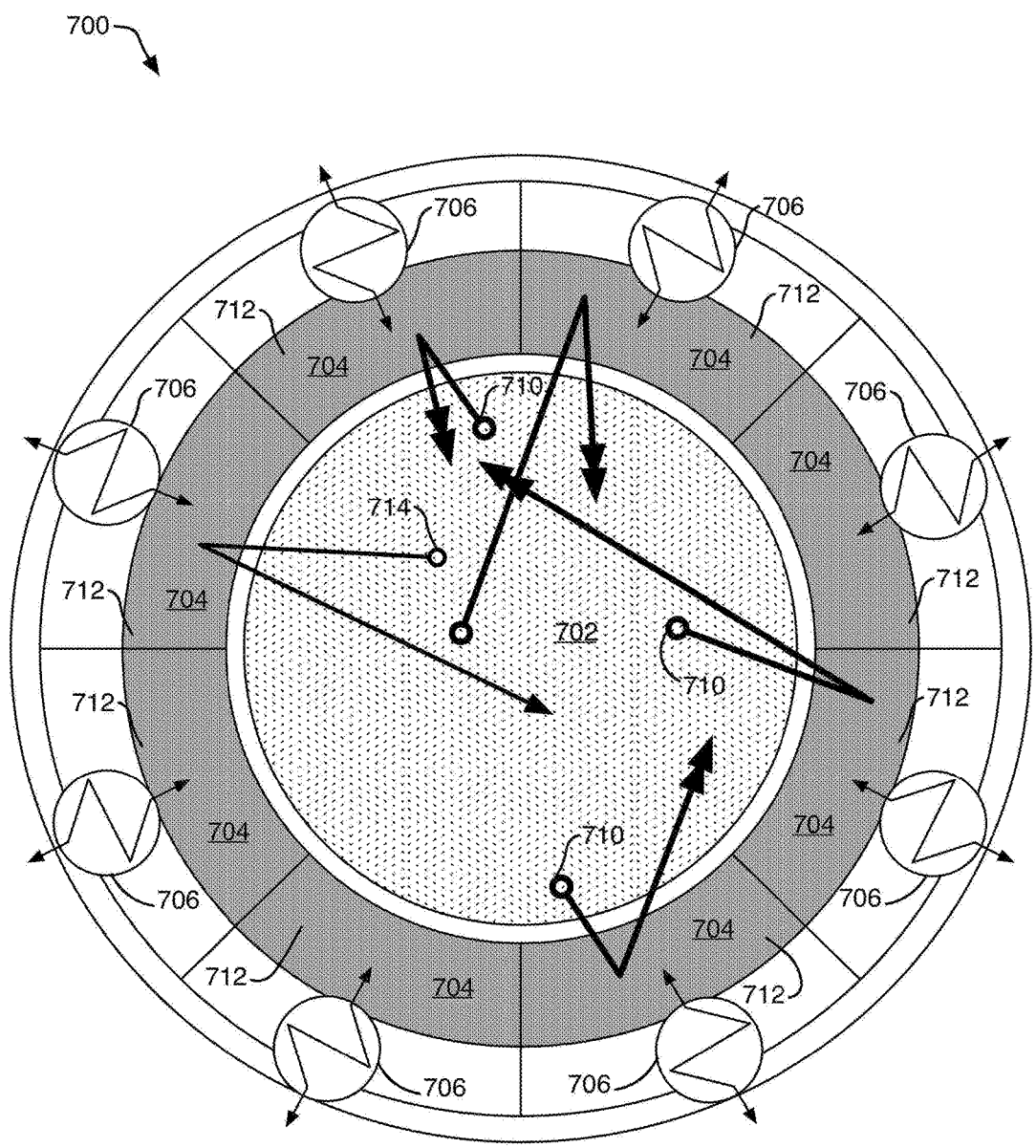
FIG. 7 depicts a top-down schematic view of an example molten nuclear fuel salt fast reactor core surrounded by a neutron reflector assembly in thermal communication with heat exchangers.

FIG. 7 is a top-down schematic view of a molten nuclear fuel salt fast reactor core with fuel region 702 surrounded by a neutron reflector assembly 700. Neutron reflector assembly 700 contains a neutron reflector material 704 flowing through channels 712. In FIG. 7, neutron reflector material 704 flows upward toward the viewer. In an implementation, neutron reflector material 704 may circulate in channels 712 with input and output ports above fuel region 702 such that no fixtures or ports are needed beneath the reactor. In other implementations, neutron reflector material 704 may flow in only one direction, either in an upward or downward direction, through channels 712 with one port above fuel region 702 and another port below fuel region 702. In yet other implementations, neutron reflector material 704 may comprise a semi-stagnant or creeping flow through channels 712. In yet other implementations, neutron reflector material 704 may flow through radial input and output ports disposed between heat exchangers 706.

Flowing dynamic neutron reflector material 704 is in thermal communication with heat exchangers 706. Heat exchangers 706 may contain one or more types of liquid coolant circulating therethrough. As neutron reflector material 704 exchanges heat with heat exchangers 706, heat exchangers 706 may transport the heat away from neutron reflector assembly 700 as part of a secondary coolant circuit. The secondary coolant circuit may supply heat to electricity generation equipment, such as, for example, a steam-driven turbine. In an implementation, molten fuel salt may flow upward through fuel region 702 and downward through heat exchangers 706, thus exchanging heat as part of a primary coolant circuit. In other words, heat exchangers 706 may exchange heat with both the molten fuel salt and exchange heat with the flowing neutron reflector material 704. The flow rate of neutron reflector material 704 may be adjusted to vary contact time with heat exchangers 706 to vary the temperature of the neutron reflector material 704. As the temperature of the neutron reflector material 704 varies, its density changes accordingly. Changes in the density of neutron reflector material 704 alter its neutron reflective characteristics as denser materials have a higher mass per unit volume and are therefore more likely to reflect neutrons.

FIG. 7 shows example fast neutrons 710 emanating from a fuel region 702. Fast neutrons are indicated by lines terminating in double arrows. Example fast neutrons 710 may originate in fuel region 702 and be reflected by a neutron reflector material 704 and travel back into fuel region 702. Example fast neutrons 710 reflected back into fuel region 702 may increase the fissile material in fuel region 702 upon contact with fertile materials. Similarly, FIG. 7 shows example thermal neutrons 714. Example thermal neutrons 714 are indicated by lines terminating in single arrows. Example thermal neutrons 714 may be reflected by neutron reflector material 704 and travel back into fuel region 702. Example thermal neutrons reflected into fuel region 702 may increase the reactivity in fuel region 702 upon contact with fissile material located therein.

Figure 8:
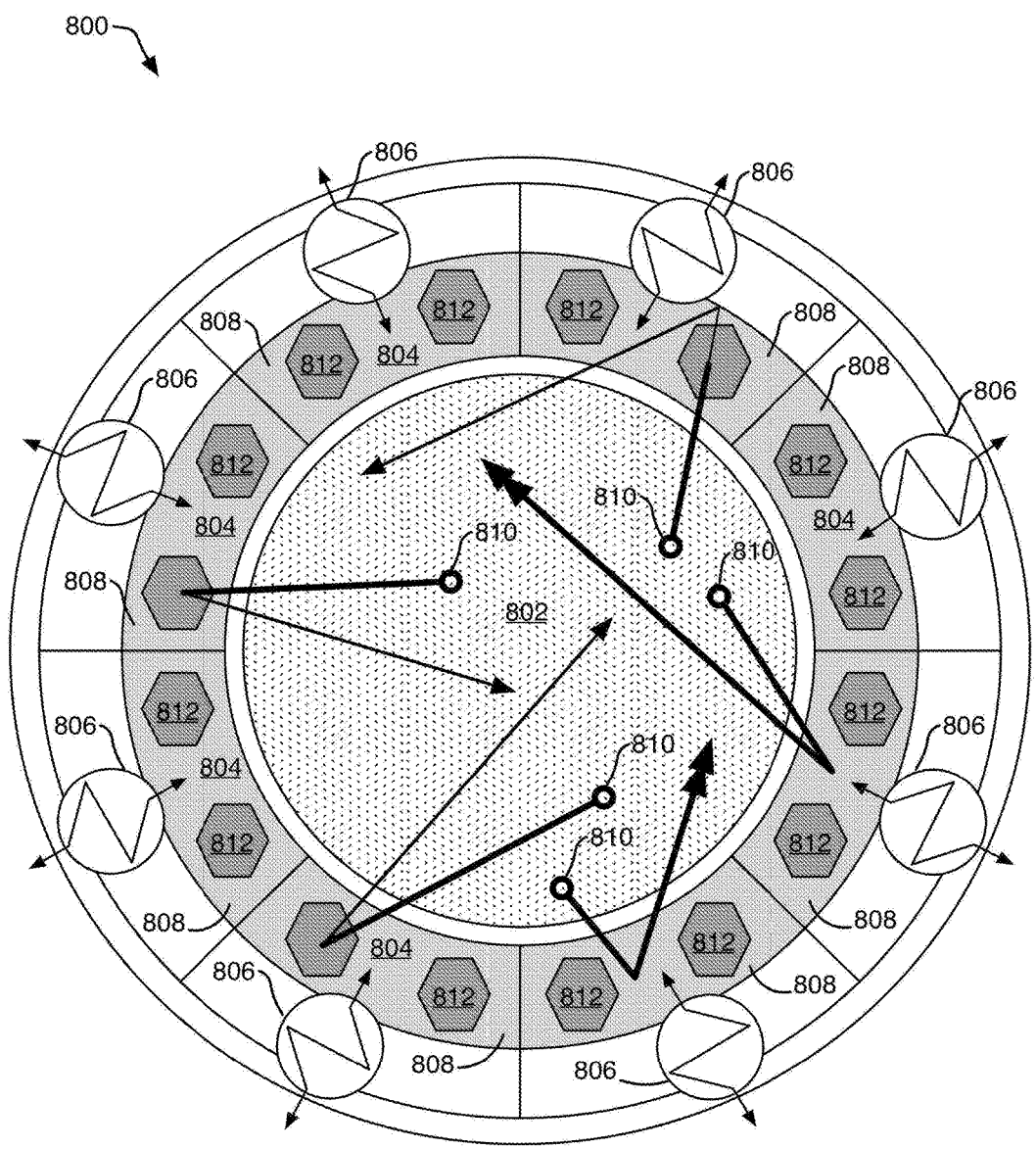
FIG. 8 depicts a top-down schematic view of an example molten nuclear fuel salt fast reactor core surrounded by a neutron reflector assembly in thermal communication with heat exchangers including neutron moderating members.

FIG. 8 is a top-down schematic view of a molten nuclear fuel salt fast reactor core with a fuel region 802 surrounded by a neutron reflector assembly 800 with a neutron reflector material 804 in thermal communication with heat exchangers 806. In FIG. 8, neutron reflector material 804 flows upward toward the viewer. In an implementation, neutron reflector material 804 may circulate in channels 808 with input and output ports above fuel region 802 such that no fixtures or ports are needed beneath the reactor. In other implementations, neutron reflector material 804 may flow in only one direction, either in an upward or downward direction, through channels 808 with one port above fuel region 802 and another port below fuel region 802. In yet other implementations, neutron reflector material 804 may comprise a semi-stagnant or creeping flow through channels 808. In yet other implementations, neutron reflector material 804 may flow through radial input and output ports disposed between heat exchangers 806.

Flowing neutron reflector material 804 is in thermal communication with heat exchangers 806. Heat exchangers 806 may contain one or more types of liquid coolant circulating therethrough. As flowing neutron reflector material 804 exchanges heat with heat exchangers 806, heat exchangers 806 may transport the heat away from the neutron reflector assembly 800 as part of a secondary coolant circuit. The secondary coolant circuit may supply heat to electricity generation equipment, such as, for example, a steam-driven turbine. In an implementation, molten fuel salt may flow upward through fuel region 802 and downward through heat exchangers 806, thus exchanging heat as part of a primary coolant circuit. In other words, heat exchangers 806 may exchange heat with both the molten fuel salt and exchange heat with the flowing neutron reflector material 804. The flow rate of neutron reflector material 804 may be adjusted to vary contact time with heat exchangers 806 to vary the temperature of neutron reflector material 804.

The reflector assembly 800 includes neutron moderating volumetric displacement members 812 inserted into fluid channels 808. Upon insertion of moderating members 812, the volume of the reflecting liquid 804 in the channel is reduced. With reduced volume, the remaining neutron reflector material 804 in the channel has an altered neutron reflectivity characteristic, and is therefore less likely to reflect neutrons than before the moderating member 812 was inserted. The presence of moderating member 812 in the area surrounding fuel region 802 makes thermalization of neutrons more likely, such as, for example, thermalized neutron 810. Increased thermalization will tend to increase burnup of fissile material in the fuel region 802.

The moderating volumetric displacement members 812 may be inserted into channels 808 singly or in any plurality of members. Moderating volumetric displacement members 812 may take on a cylindrical shape, a square or rectangular prism shape, a triangular prism shape, a polygonal prism shape and the like. In another implementation, moderating volumetric displacement members 812 may include a set of members (not shown). Selection of the geometric shape and number of moderating volumetric displacement members 812 per channel 808 will determine the ratio of moderating material to reflector material in channels 808. Selectively inserting moderating volumetric displacement members 812 permits adjustment of breed rate and reactivity in fuel region 802 and allows maintenance of a desired burnup level. In an implementation, a burnup rate is maintained within a desired upper and lower bound by selectively inserting and removing at least a subset of moderating volumetric displacement members 812.

Figure 9:
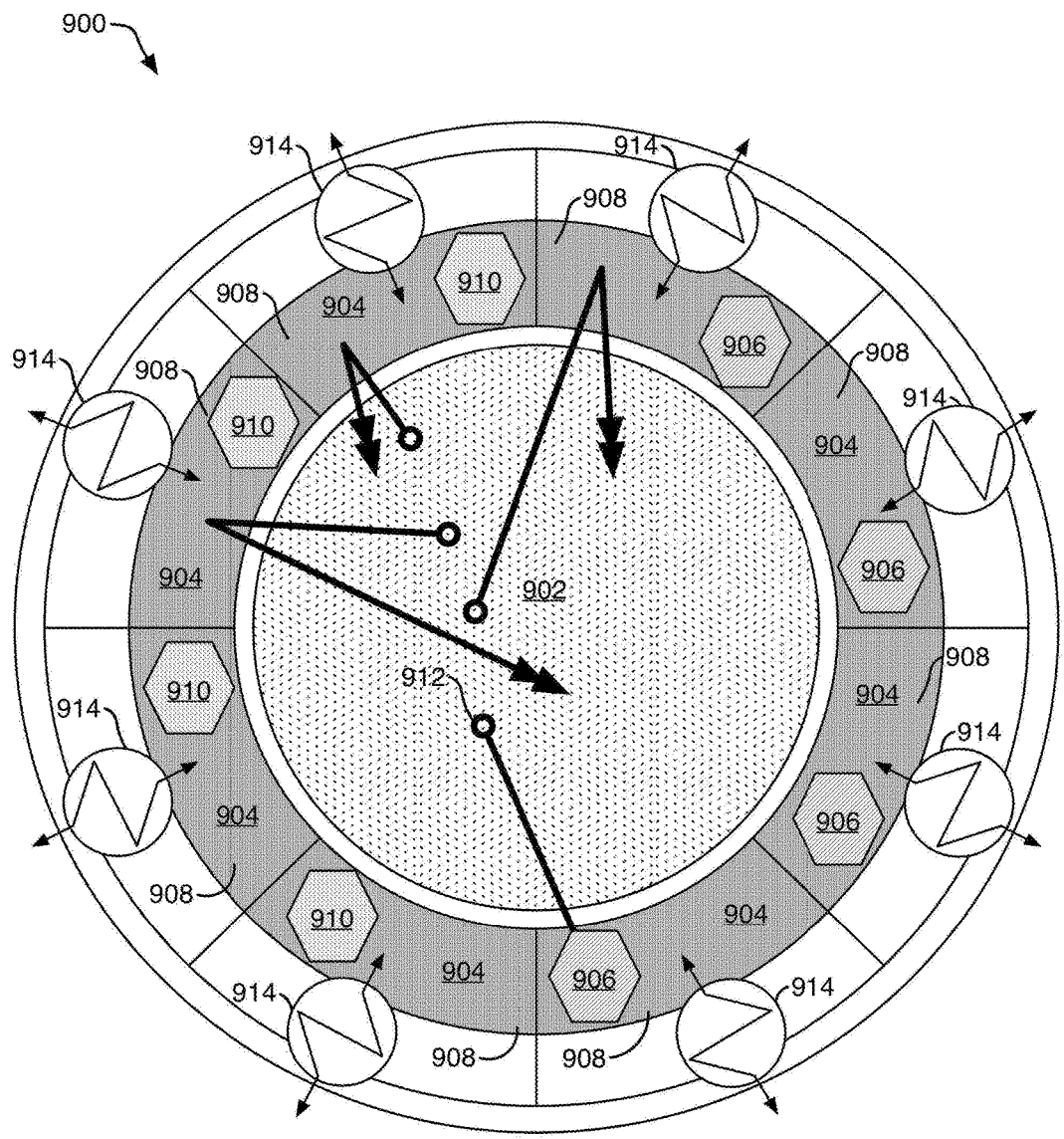
FIG. 9 depicts a top-down schematic view of an example molten nuclear fuel salt fast reactor core surrounded by a neutron reflector assembly in thermal communication with heat exchangers including neutron absorbing members and volumetric displacement members.

FIG. 9 is a top-down schematic view of a molten nuclear fuel salt fast reactor core with a fuel region 902 surrounded by a neutron reflector assembly 900 with a flowing neutron reflector material 904 through channels 908. In FIG. 9, neutron reflector material 904 flows upward toward the viewer. In an implementation, neutron reflector material 904 may circulate in channels 908 with input and output ports above fuel region 902 such that no fixtures or ports are needed beneath the reactor. In other implementations, liquid neutron reflector 904 may flow in only one direction, either in an upward or downward direction, through channels 908 with one port above the fuel region 902 and another port below the fuel region 902. In yet other implementations, liquid neutron reflector 904 may comprise a semi-stagnant or creeping flow through channels 908. In yet other implementations, liquid neutron reflector 904 may flow through radial input and output ports disposed between heat exchangers 914.

Flowing neutron reflector material 904 is in thermal communication with heat exchangers 914. Heat exchangers 914 may contain one or more types of liquid coolant circulating therethrough. As flowing neutron reflector material 904 exchanges heat with heat exchangers 914, heat exchangers 914 may transport the heat away from neutron reflector assembly 900 as part of a secondary coolant circuit. The secondary coolant circuit may supply heat to electricity generation equipment, such as, for example, a steam-driven turbine. In an implementation, molten fuel salt may flow upward through fuel region 902 and downward through heat exchangers 914, thus exchanging heat as part of a primary coolant circuit. In other words, heat exchangers 914 may exchange heat with both the molten fuel salt and exchange heat with the flowing neutron reflector material 904. The flow rate of neutron reflector material 904 may be adjusted to vary contact time with heat exchangers 914 to vary the temperature of neutron reflector material 904. As the temperature of neutron reflector material 904 varies, its density changes accordingly. Changes in the density of neutron reflector material 904 alter its neutron reflective characteristics as denser liquids have a higher mass per unit volume and are therefore more likely to reflect neutrons.

Reflector assembly 900 includes selectively inserted neutron absorbing members 906 and selectively inserted volumetric displacement members 910. Neutron absorbing members 906 and volumetric displacement members 910 may be of any geometric shape compatible with the shape of channels 908. Neutron absorbing members 906 and volumetric displacement members 910 displace a volume of flowing neutron reflector material 904 in the channel 908 into which they are inserted, thus lowering the neutron reflectivity of that channel. Selectively inserting neutron absorbing members 906 and volumetric displacement members 910 adjusts the neutron reflectivity in the nuclear reactor core by altering the composition of the material in the neutron reflection assembly. Several scenarios are possible for fast neutrons travelling into volumetric displacement members 910, such as example fast neutron 910. Fast neutron 912 may pass through the member 910 (not shown in FIG. 9), fast neutron 912 may be reflected by the remaining flowing neutron reflector material 904 in the channel, or fast neutron 912 may be reflected by another surface (not shown). Example fast neutron 912 is less likely to reflect back into fuel region 902 when a volumetric displacement member 910 is inserted than when the channel is full of the flowing neutron reflector material 904.

Inserting neutron absorption member 906 is another way of adjusting neutron reflectivity in the nuclear reactor core by altering the composition of the material in the neutron reflection assembly. When neutron absorption member 906 is inserted into a channel 908, example fast neutron 912 may strike and be absorbed by the absorption member 906. Other scenarios are also possible. Example fast neutrons may be reflected by flowing neutron reflector material 904 that was not displaced by absorption member 906, or it may exit the core region where it may be reflected or absorbed by other material (not shown). In another implementation, neutron absorption members 906 may be inserted into a channel 908 while flowing neutron reflector material 904 is removed from the channel.

It should be understood that volumetric displacement members 910 and neutron absorption members 906 may be selectively inserted into channels 908 in any desired configuration and in any combination with other members not shown in FIG. 9, such as neutron moderating members. Any number of volumetric displacement members 910 and neutron absorption members 906 may be inserted into a single channel, alone or in combination with other insertable members. Volumetric displacement members 910 and neutron absorption members 906 may be inserted into only some of the channels 908, or only into channels on a portion of dynamic reflector 900. It may be desirable to focus the location of breeding or burning in fuel region 902 by choosing an insertion configuration that concentrates the desired neutron activity in a desired location. For example, an increased breed may be induced in the upper half of fuel region 902 by selectively removing members inserted in the upper half of reflector assembly 900 to allow the neutron reflector material 904 to fill channels 908 on the upper half of the reflector assembly 900. In another example, an increased burn may be induced in the lower half of fuel region 902 by selectively inserting neutron moderating members into the channels 908 on the lower half of reflector assembly 900. In yet another example, reactivity in a portion of fuel region 902 may be reduced by selectively inserting neutron absorbing members 906 into the channels 908 located on the desired side of reflector assembly 900.

In the implementation of FIG. 9, flowing neutron reflector material 904 in the channels 908 are in thermal communication with heat exchangers 914. Varying the flow rate of flowing neutron reflector material 904 in channels 908 may alter the flowing reflecting liquid's temperature, and thus its density and thus its neutron reflection characteristics. Altering the density of the flowing neutron reflector material 904 is another way of adjusting the neutron reflectivity in the nuclear reactor core by altering the composition of the material in the neutron reflection assembly. By way of the heat exchangers 914, flowing neutron reflector material 904 in the channels 908 is a secondary coolant for the fuel region 902 because it may operate to exchange heat with the molten fuel salt in the fuel region 902 to the outside of the reactor core via the heat exchangers 914.

Figure 10:
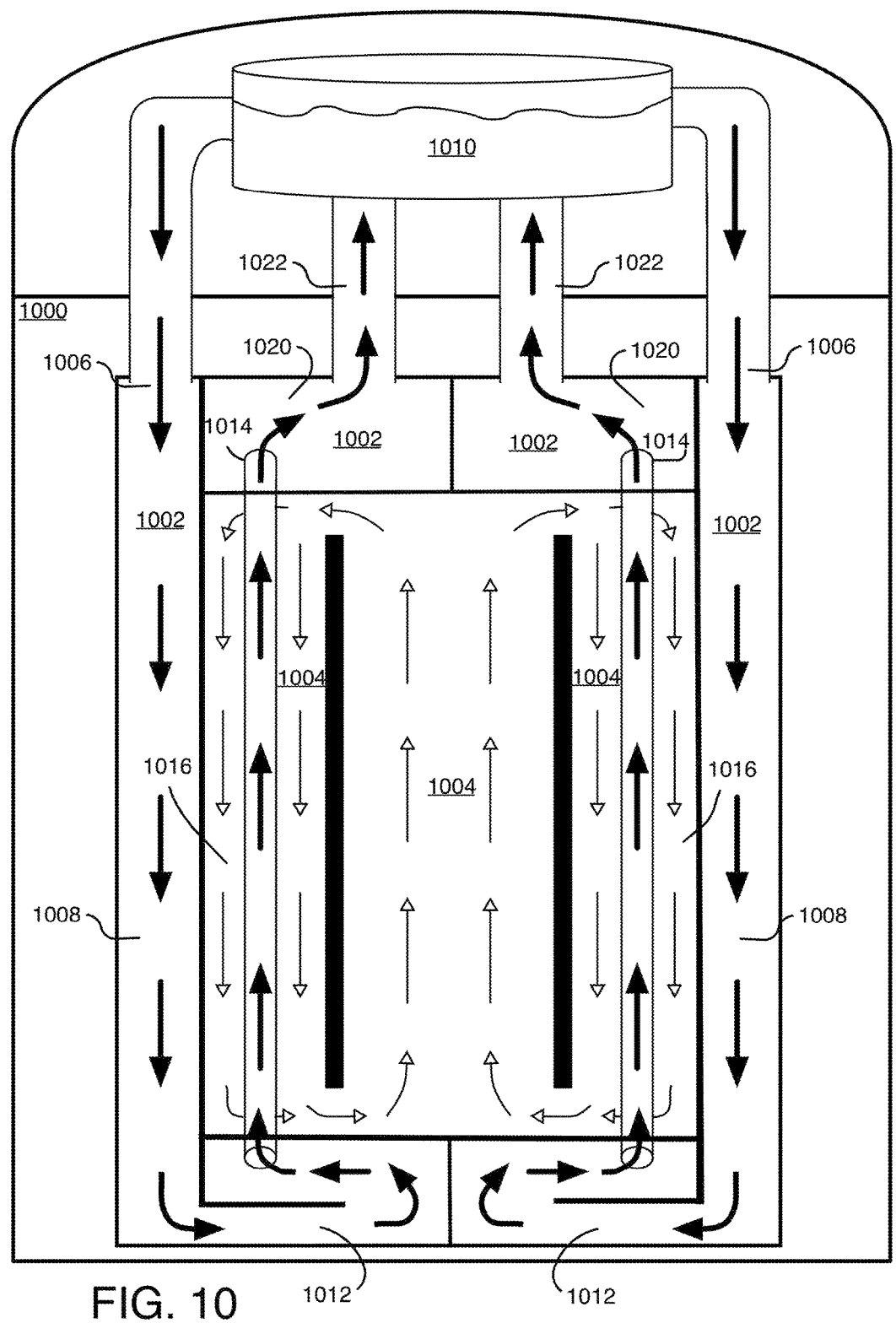
FIG. 10 depicts a side schematic view of an example molten nuclear fuel salt fast reactor core surrounded by a neutron reflector assembly in thermal communication with a molten nuclear fuel salt through a tube and shell heat exchanger.

FIG. 10 is a side schematic view of a molten nuclear fuel salt fast reactor core surrounded by a dynamic neutron reflector assembly 1000 with a neutron reflector material 1002 in thermal communication with a molten nuclear fuel salt 1004 in a tube and shell heat exchanger. Flowing reflecting liquid 1002 flows through inlets 1006 and into outer channels 1008. Outer channels 1008 provide a neutron reflecting layer from which fast neutrons emanating from fuel region 1004 may be reflected back into the fuel region 1004. After leaving outer channels 1012, flowing reflecting liquid 1002 flows through lower channels 1012. Lower channels 1012 provide a neutron reflecting layer from which fast neutrons emanating from fuel salt 1004 may be reflected back into the fuel salt 1004. After leaving lower channels 1012, flowing neutron reflector material 1002 flows upwards through tubes 1014.

Tubes 1014 are in thermal communication with molten fuel salt 1004 flowing downward in channels 1016 surrounding tubes 1014 in a shell-and-tube configuration, and therefore function as a secondary coolant for the reactor core. Tubes 1014 may be configured as any number of tubes of any diameter and cross-sectional geometry. Configuration of tubes 1014 may be chosen for a desired surface area contact with flowing molten fuel salt 1004 in the region 1016 for a desired thermal exchange between the flowing neutron reflector material 1002 and the molten fuel salt 1004. After leaving tubes 1014, flowing neutron reflector material 1002 enters upper channel 1020. Upper channel 1020 provides a reflecting layer from which neutrons emanating from fuel region 1004 may be reflected back into fuel region 1004. Heat exchangers (not shown) may be in thermal communication with flowing neutron reflector material 1002. In an implementation, heat exchangers may be disposed outside channel 1008. In another implementation, heat exchangers may be disposed above flowing neutron reflector material inlet 1006 or outlet 1022. By way of the heat exchangers, flowing neutron reflector material 1002 is a secondary coolant for fuel region 1004 because it may operate to exchange heat with the molten fuel salt to the outside of the reactor core.

Neutron reflectivity in the nuclear reactor core may be adjusted by altering the composition of the reflecting liquid in channels 1008, 1012, 1020. For example, the volume of flowing neutron reflector material 1002 may be adjusted by pumping an amount of the flowing neutron reflector material 1002 into or out of overflow tank 1010, thus increasing or decreasing the reflectivity, respectively. In another example, the density of flowing neutron reflector material 1002 through channels 1008, 1012, 1020 may be adjusted. A higher density of flowing neutron reflector material 1002 may lead to an increased neutron reflectivity while a lower density of flowing neutron reflector material 1002 may lead to a decreased neutron reflectivity. The density of flowing neutron reflector material 1002 may be adjusted by varying temperature. Temperature of flowing neutron reflector material 1002 may be adjusted by varying flow rate, and thus thermal contact time with the molten fuel salt 1004. Alternatively, or additionally, the direction of flow of the flowing neutron reflector material 1002 may be reversed. As such, the flowing neutron reflector material 1002 may flow in a downward direction through tubes 1014 and up through channels 1008 into overflow tank 1010. The direction of flow of the molten nuclear fuel salt 1004 may also be reversed. As such, the molten nuclear fuel salt 1004 may flow in a downward direction in the center of the fission region and flow in an upward direction around tubes 1014.

Figure 11:
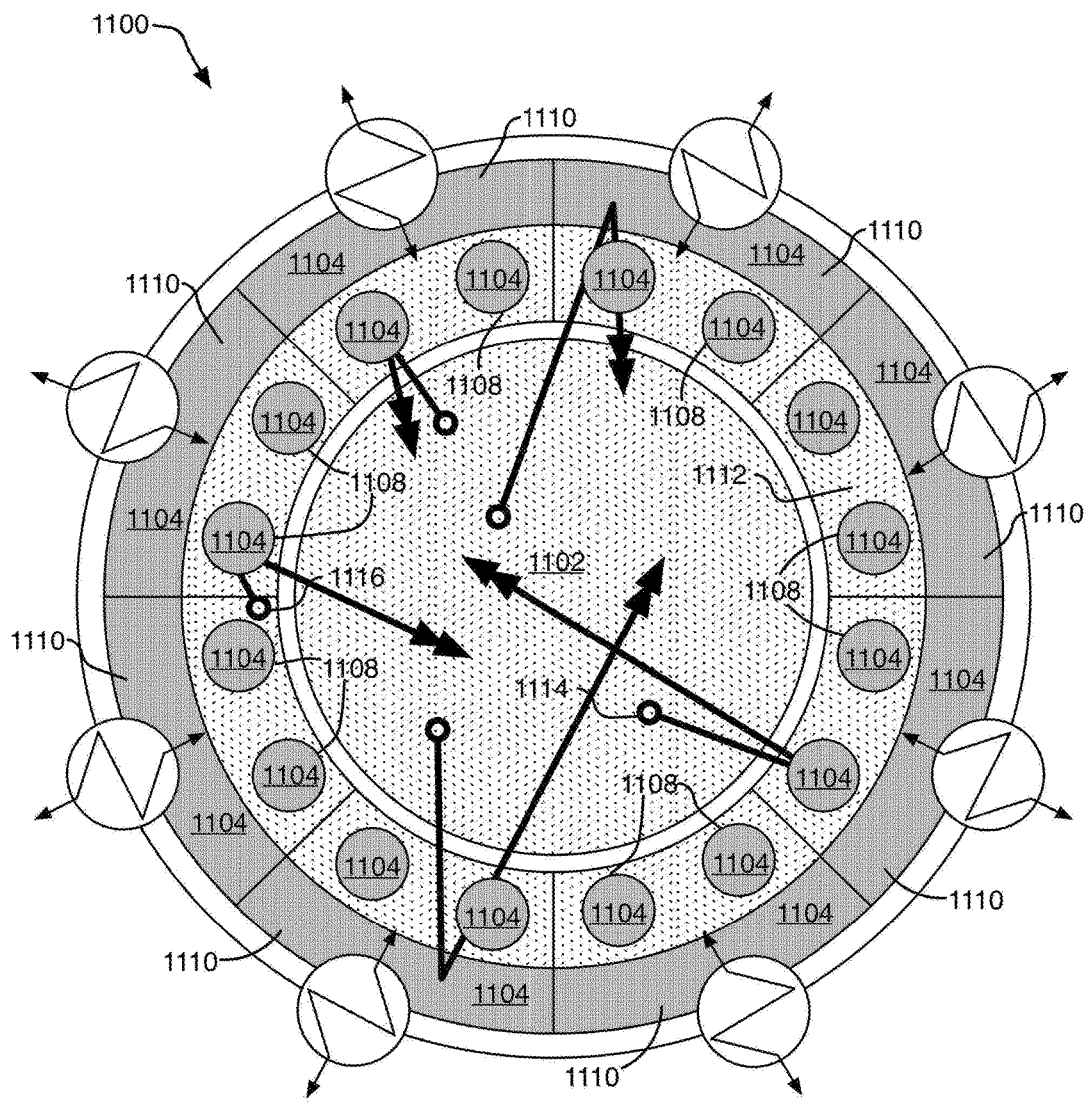
FIG. 11 depicts a top-down schematic view of an example molten nuclear fuel salt fast reactor core surrounded by a neutron reflector assembly in thermal communication with a molten nuclear fuel salt through a tube and shell heat exchanger.

FIG. 11 is a top-down schematic view of a molten nuclear fuel salt fast reactor core with fuel region 1102 surrounded by a neutron reflector assembly 1100 with a neutron reflector material 1104 flowing through channels 1110, and flowing through tubes 1108 in channels 1112, tubes 1108 being in thermal communication with a molten nuclear fuel salt flowing through fuel region 1102 and through channels 1112 in a tube and shell style heat exchanger. From the viewpoint of FIG. 11, the molten fuel salt flows upward through fuel region 1102 and downward through channels 1112. The flowing reflecting liquid flows downward through channels 1110 and upward through tubes 1108. In this implementation, the flowing reflecting liquid 1104 is also a secondary coolant for the fuel in fuel region 1102. Tubes 1108 may take a variety of configurations, including without limitation any number of tubes in each channel 1112 or tubes of any geometric shape. Selection of the number of tubes 1108 per channel 1112 and the shape of tubes 1108 will determine the surface area in contact with molten fuel salt flowing upward in channel 1112, and alter the amount of heat exchanged between flowing reflecting liquid 1104 and molten fuel salt 1102. Although pairs of tubes 1108 per channel 1112 are shown in FIG. 11, a variety of configurations are possible. For example, tubes 1108 may take a meandering path through channels 1112 to increase surface area thermally exposed to the molten fuel salt. In another implementation, channels 1112 may contain a series of baffles around which the molten fuel salt must flow in an indirect pattern between the inlet and outlet ports. The indirect flow pattern increases the thermal contact between the molten fuel salt and the tubes, and increases the angle between the tubes and the molten fuel salt flow to increase thermal communication.

In an embodiment, example fast neutrons 1114 emanating from fuel region 1102 may be reflected by flowing reflecting liquid 1104 contained in tubes 1008 or be reflected by flowing reflecting liquid 1104 contained in channels 1110, and back into fuel region 1102. Fast neutrons such as example fast neutron 1116 emanating from molten fuel salt flowing in channels 1112 may also be reflected by flowing reflector material 1104 in tubes 1108 or in channels 1110, and back into fuel region 1102.

Figure 12:
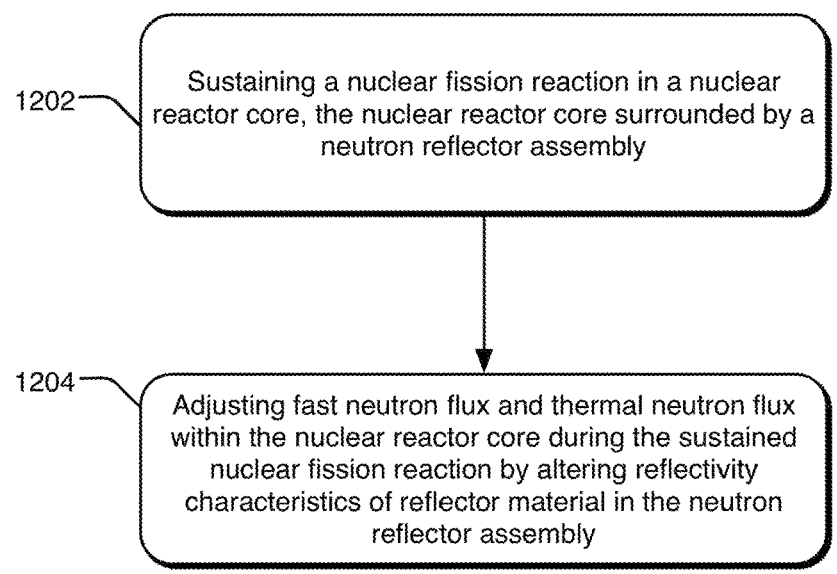
FIG. 12 depicts a flow diagram of an example method of dynamic spectrum shifting in a molten nuclear fuel salt fast reactor.

FIG. 12 depicts a flow diagram of example operations 1200 of dynamic spectrum shifting in a molten nuclear fuel salt fast reactor. A sustaining operation 1202 sustains a nuclear fission reaction in a nuclear reactor core surrounded by a dynamic neutron reflector assembly. The neutron reflector assembly may have at least one neutron reflector material. A neutron reflection assembly may surround a nuclear reactor core by being disposed radially around, above, and/or below the reactor core. The neutron reflection assembly may be formed in one contiguous piece, formed into discrete pieces distributed around the reactor core, disposed around the core in discrete pieces with gaps in between, and/or segmented into regular or irregular sections. The reflection assembly may contain one or more channels for conducting a flowing reflector material. The reflection assembly may contain one or more levels of channels, such that a flowing reflector material flows in one direction in one level, and flows in another direction in one or more other levels. For example, the reflection assembly may contain an outer channel with flowing reflector material flowing downward, and another inner channel with flowing reflector material flowing upward to avoid any inlet or outlet plumbing underneath the reactor core.

The reflection assembly may further be in thermal communication with one or more heat exchangers, and therefore function as a secondary coolant for the reactor core. In one implementation, heat exchangers are thermally coupled to channels for conducting the flowing reflector material. Another implementation may utilize a tube-and-shell heat exchanger wherein a first channel conducts a flowing reflector material in a first direction, and one or more additional channels conduct the flowing reflector material in a second direction through one or more tubes surrounded by flowing molten fuel salt.

An adjusting operation 1204 adjusts fast neutron flux and thermal neutron flux within the nuclear reactor core during the sustained nuclear fission reaction by altering reflectivity characteristics of reflector material in the neutron reflector assembly. Altering reflectivity characteristics of reflector material in the neutron reflector assembly may include: any one or more of modifying the volume of reflector material in the reflector assembly, modifying the density of reflector material in the reflector assembly, modifying the composition of reflector material in the reflector assembly, inserting and/or removing neutron moderating members into the reflector assembly, inserting and/or removing neutron absorbing members into the reflector assembly, and/or inserting and/or removing volumetric displacement members into the reflector assembly.

Figure 13:
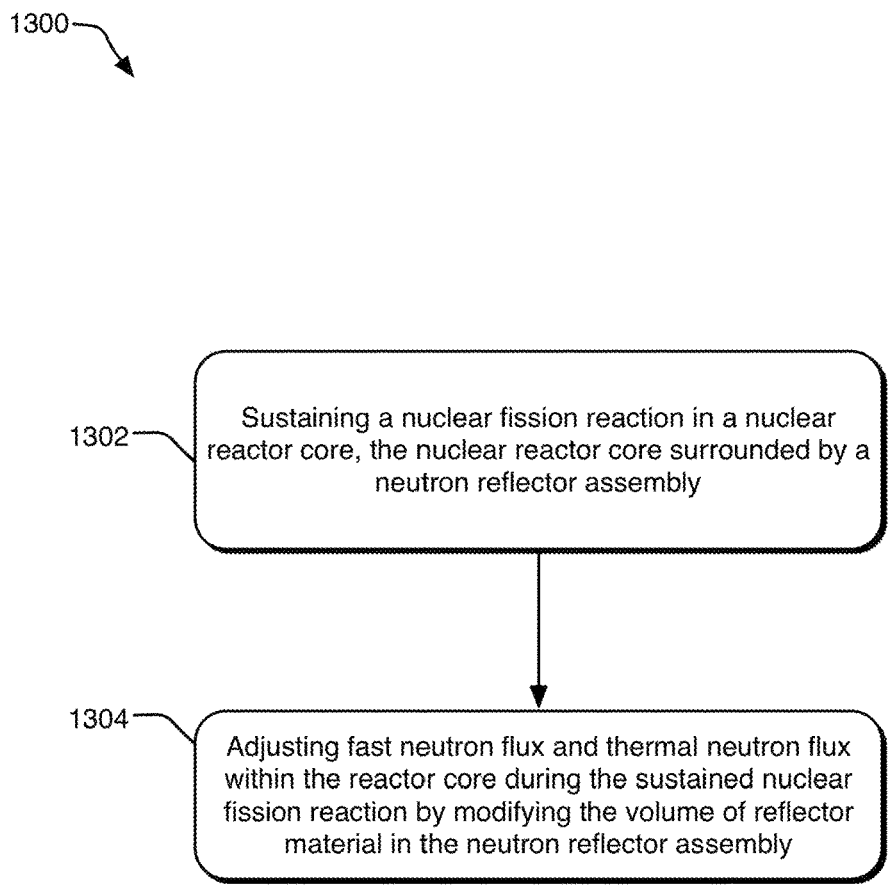
FIG. 13 depicts a flow diagram of another example method of dynamic spectrum shifting in a molten nuclear fuel salt fast reactor.

FIG. 13 depicts a flow diagram of other example operations 1300 of dynamic spectrum shifting in a molten nuclear fuel salt fast reactor. A sustaining operation 1302 sustains a nuclear fission reaction in a nuclear reactor core surrounded by a neutron reflector assembly. The neutron reflector assembly may have at least one neutron reflector material. A neutron reflection assembly may surround a nuclear reactor core by being disposed radially around, above, and/or below the reactor core. The neutron reflection assembly may be formed in one contiguous piece, formed into discrete pieces distributed around the reactor core, disposed around the core in discrete pieces with gaps in between, and/or segmented into regular or irregular sections. The reflection assembly may contain one or more channels for conducting a flowing reflector material. The reflection assembly may contain one or more levels of channels, such that a flowing reflector material flows in one direction in one level, and flows in another direction in one or more other levels. For example, the reflection assembly may contain an outer channel with flowing reflector material flowing downward, and another inner channel with flowing reflector material flowing upward to avoid any inlet or outlet plumbing underneath the reactor core.

The reflection assembly may further be in thermal communication with one or more heat exchangers, and therefore function as a secondary coolant for the reactor core. In one implementation, heat exchangers are thermally coupled to channels for conducting the flowing reflector material. Another implementation may utilize a tube-and-shell heat exchanger wherein a first channel conducts a flowing reflector material in a first direction, and one or more additional channels conduct the flowing reflector material in a second direction through one or more tubes surrounded by flowing molten fuel salt.

An adjusting operation 1304 adjusts fast neutron flux and thermal neutron flux within the reactor core during the sustained nuclear fission reaction by modifying the volume of reflector material in the neutron reflector assembly. In an implementation, volume of a flowing reflector material may be altered by a pump and valve fluidically coupled to a spillover reservoir. A volume of flowing reflector material may be pumped through the valve and into the spillover reservoir to reduce volume of reflector material in the reflection assembly, and thus reduce the flux of fast and/or thermal neutrons scattered into the reactor core. Conversely, a volume of flowing material may be pumped though the valve out of the spillover reservoir to increase volume in the reflector assembly, and thus increase reflectivity of neutrons into the reactor core.

In another implementation, altering the composition of material in the neutron reflector assembly may include selectively inserting or removing a volumetric displacement member into one or more channels conducting a flowing reflector material. In implementations, a volumetric displacement member may be a neutron moderating member, a neutron absorbing member, or a volumetric displacement member that does not influence neutron flux (e.g., a hollow member or a member formed of non-neutron influencing materials). Insertion of a volumetric displacement member into a channel conducting flowing reflector material surrounding a reactor core reduces the volume of the reflector material in a channel, and thus alters the reflectivity characteristics of the reflector assembly by reducing the scattering of neutrons because fewer neutrons are likely to be scattered due to a reduced volume of reflector material. Removing a volumetric displacement member from a channel conducting a flowing reflector material surrounding a nuclear reactor core may increase the volume of the flowing reflector material, and thus alters the reflectivity characteristics of the reflector assembly by increasing the scattering of neutrons because flowing reflector material may return to the reflector assembly into the space vacated by the withdrawn volumetric displacement member, thus increasing the likelihood that neutrons emanating from a reactor core will be scattered due to increased volume of reflector material.

Figure 14:
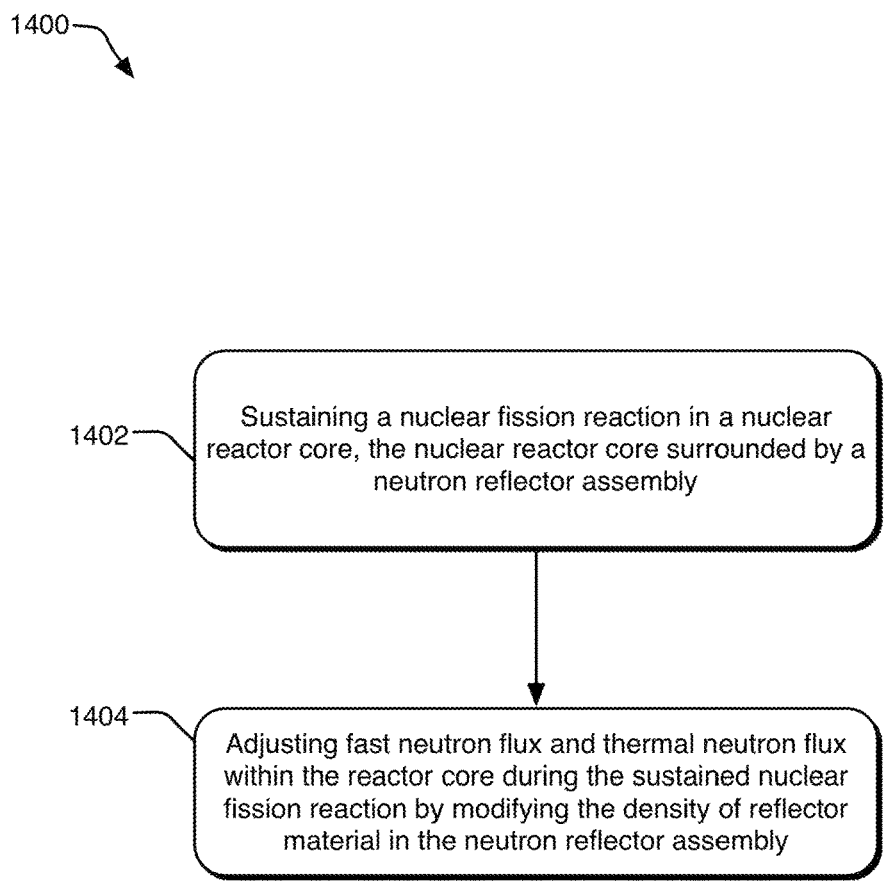
FIG. 14 depicts a flow diagram of another example method of dynamic spectrum shifting in a molten nuclear fuel salt fast reactor.

FIG. 14 depicts a flow diagram of other example operations 1400 of dynamic spectrum shifting in a molten nuclear fuel salt fast reactor. A sustaining operation 1402 sustains a nuclear fission reaction in a nuclear reactor core surrounded by a neutron reflector assembly. The neutron reflector assembly may have at least one neutron reflector material. A neutron reflection assembly may surround a nuclear reactor core by being disposed radially around, above, and/or below the reactor core. The neutron reflection assembly may be formed in one contiguous piece, formed into discrete pieces distributed around the reactor core, disposed around the core in discrete pieces with gaps in between, and/or segmented into regular or irregular sections. The reflection assembly may contain one or more channels for conducting a flowing reflector material. The reflection assembly may contain one or more levels of channels, such that a flowing reflector material flows in one direction in one level, and flows in another direction in one or more other levels. For example, the reflection assembly may contain an outer channel with flowing reflector material flowing downward, and another inner channel with flowing reflector material flowing upward to avoid any inlet or outlet plumbing underneath the reactor core.

The reflection assembly may further be in thermal communication with one or more heat exchangers, and therefore function as a secondary coolant for the reactor core. In one implementation, heat exchangers are thermally coupled to channels for conducting the flowing reflector material. Another implementation may utilize a tube-and-shell heat exchanger wherein a first channel conducts a flowing reflector material in a first direction, and one or more additional channels conduct the flowing reflector material in a second direction through one or more tubes surrounded by flowing molten fuel salt.

An adjusting operation 1404 adjusts fast neutron flux and thermal neutron flux within the reactor core during the sustained nuclear fission reaction by modifying the density of reflector material in the neutron reflector assembly. Density of reflector material in the neutron reflector assembly may be modified by altering the temperature of a flowing neutron reflector material in the reflector assembly. At higher temperatures, a flowing neutron reflector material tends to have lower density, and, at lower temperatures, a flowing neutron reflector material tends to have higher density. Changes in density will alter the alter the reflectivity characteristics of the reflector assembly because fast and thermal neutrons emanating from the reactor core will be more or less likely to be scattered by the reflector material depending on the likelihood of a collision with the nuclei of the reflector material in the reflector assembly. One way of altering the temperature of a flowing neutron reflector material is to alter its flow rate, and thus the thermal contact time the flowing reflector material has with a molten fuel salt. A higher flow rate may reduce contact time with a hot fuel salt, thus lowering the flowing reflector material's temperature and increasing the flowing reflector material's density. A lower flow rate may leave the flowing reflector material in thermal contact with the hot fuel salt for a relatively longer period of time, thus increasing its temperature and lowering the flowing reflector material's density.

In another embodiment, a tube and shell heat exchanger may be employed to exchange heat between the flowing reflector material and the molten fuel salt. The tube and shell heat exchanger may be configured with baffles to route the molten fuel salt in a meandering path around tubes carrying the flowing reflector material. Movable baffles may increase or decrease the thermal contact time between the flowing reflector material and the molten fuel salt. As described above, a change in thermal contact time between the flowing reflector material and the molten fuel salt may tend to alter the temperature, and thus density, of the flowing reflector material.

Figure 15:
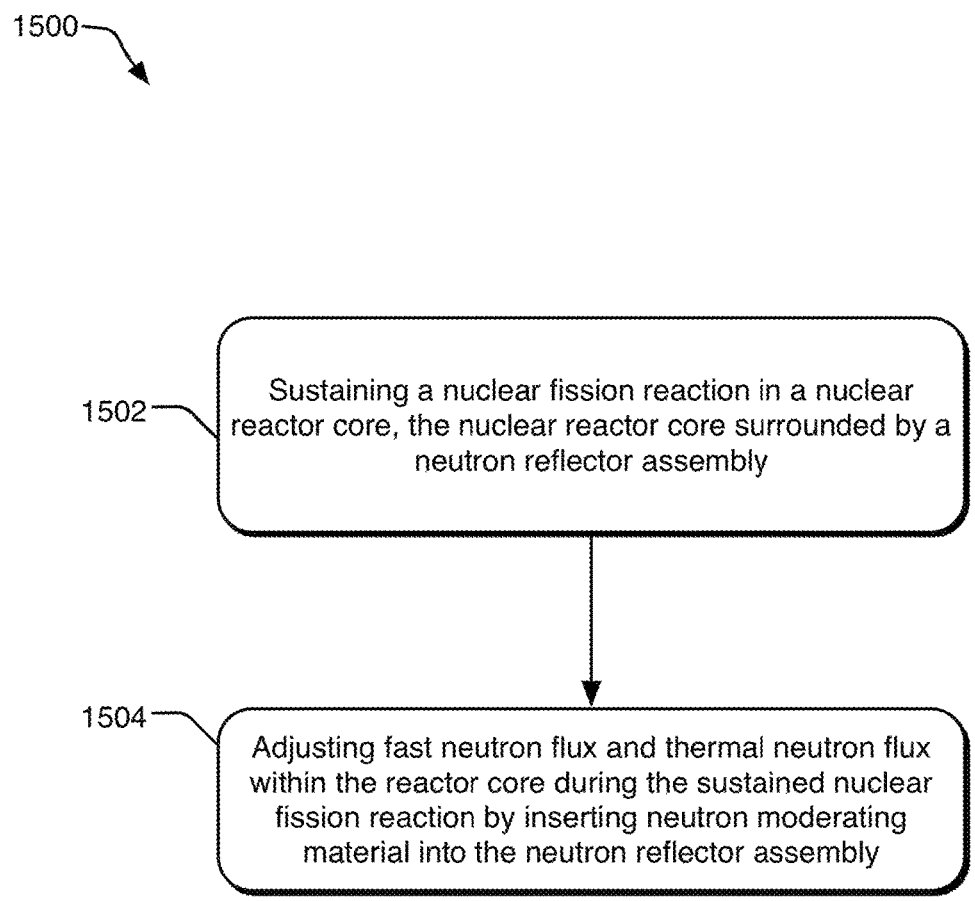
FIG. 15 depicts a flow diagram of another example method of dynamic spectrum shifting in a molten nuclear fuel salt fast reactor.

FIG. 15 depicts a flow diagram of other example operations 1500 of dynamic spectrum shifting in a molten nuclear fuel salt fast reactor. A sustaining operation 1502 sustains a nuclear fission reaction in a nuclear reactor core surrounded by a dynamic neutron reflector assembly. The neutron reflector assembly may have at least one neutron reflector material. A neutron reflection assembly may surround a nuclear reactor core by being disposed radially around, above, and/or below the reactor core. The neutron reflection assembly may be formed in one contiguous piece, formed into discrete pieces distributed around the reactor core, disposed around the core in discrete pieces with gaps in between, and/or segmented into regular or irregular sections. The reflection assembly may contain one or more channels for conducting a flowing reflector material. The reflection assembly may contain one or more levels of channels, such that a flowing reflector material flows in one direction in one level, and flows in another direction in one or more other levels. For example, the reflection assembly may contain an outer channel with flowing reflector material flowing downward, and another inner channel with flowing reflector material flowing upward to avoid any inlet or outlet plumbing underneath the reactor core.

The reflection assembly may further be in thermal communication with one or more heat exchangers, and therefore function as a secondary coolant for the reactor core. In one implementation, heat exchangers are thermally coupled to channels for conducting the flowing reflector material. Another implementation may utilize a tube-and-shell heat exchanger wherein a first channel conducts a flowing reflector material in a first direction, and one or more additional channels conduct the flowing reflector material in a second direction through one or more tubes surrounded by flowing molten fuel salt.

An adjusting operation 1504 adjusts fast neutron flux and thermal neutron flux within the reactor core during the sustained nuclear fission reaction by inserting a neutron moderating member into the neutron reflector assembly. Insertion of a neutron moderating member may introduce nuclei into the reflector assembly that may tend to cause elastic collisions with fast neutrons. The presence of these nuclei may scatter thermal neutrons back into the nuclear reactor core, thus increasing burnup. Adjusting operation 1504 may also have an effect on the neutron reflectivity characteristics of the neutron reflection assembly because the neutron moderating member will displace a volume of flowing neutron reflector material from the neutron reflector assembly. The decrease in volume of flowing neutron reflector material will tend to decrease the amount of elastic collisions with neutrons emanating from the nuclear reactor core, thus reducing the likelihood of scattering fast neutrons emanating from the nuclear reactor core back into the reactor core to breed fertile material into fissile material.

Figure 16:
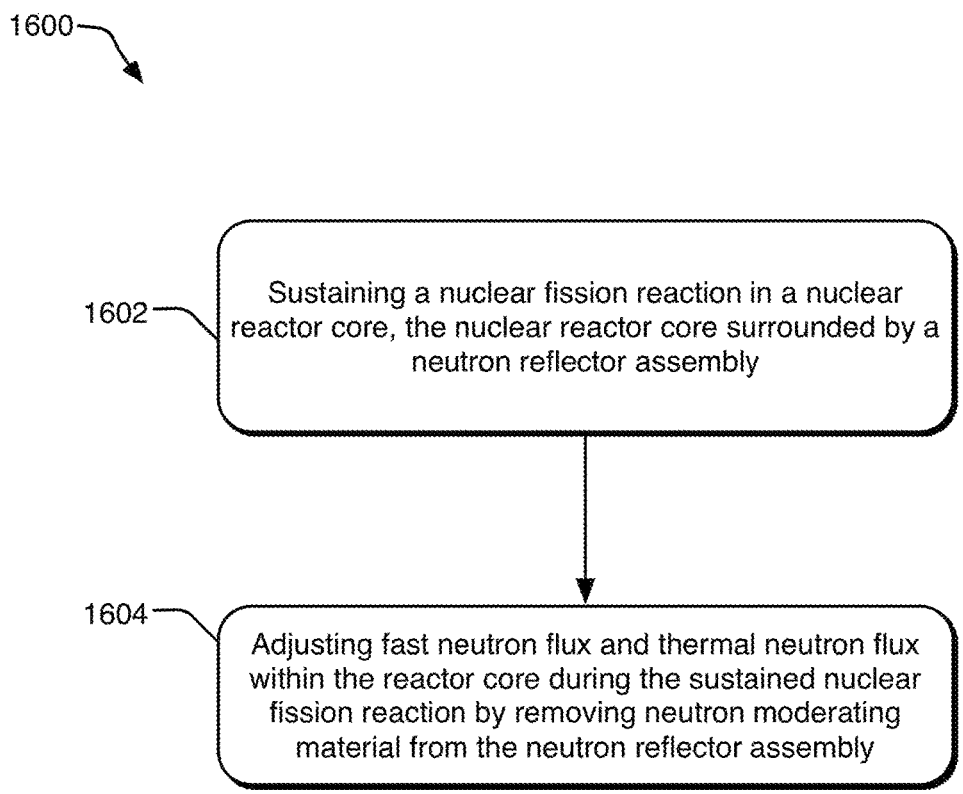
FIG. 16 depicts a flow diagram of another example method of dynamic spectrum shifting in a molten nuclear fuel salt fast reactor.

FIG. 16 depicts a flow diagram of other example operations 1600 of dynamic spectrum shifting in a molten nuclear fuel salt fast reactor. A sustaining operation 1602 sustains a nuclear fission reaction in a nuclear reactor core surrounded by a dynamic neutron reflector assembly. The neutron reflector assembly may have at least one neutron reflector material. A neutron reflection assembly may surround a nuclear reactor core by being disposed radially around, above, and/or below the reactor core. The neutron reflection assembly may be formed in one contiguous piece, formed into discrete pieces distributed around the reactor core, disposed around the core in discrete pieces with gaps in between, and/or segmented into regular or irregular sections. The reflection assembly may contain one or more channels for conducting a flowing reflector material. The reflection assembly may contain one or more levels of channels, such that a flowing reflector material flows in one direction in one level, and flows in another direction in one or more other levels. For example, the reflection assembly may contain an outer channel with flowing reflector material flowing downward, and another inner channel with flowing reflector material flowing upward to avoid any inlet or outlet plumbing underneath the reactor core.

The reflection assembly may further be in thermal communication with one or more heat exchangers, and therefore function as a secondary coolant for the reactor core. In one implementation, heat exchangers are thermally coupled to channels for conducting the flowing reflector material. Another implementation may utilize a tube-and-shell heat exchanger wherein a first channel conducts a flowing reflector material in a first direction, and one or more additional channels conduct the flowing reflector material in a second direction through one or more tubes surrounded by flowing molten fuel salt.

An adjusting operation 1604 adjusts fast neutron flux and thermal neutron flux within the reactor core during the sustained nuclear fission reaction by removing a neutron moderating member out of the neutron reflector assembly. Removal of a neutron moderating member will reduce available nuclei in the reflector assembly that may tend to cause elastic collisions with fast neutrons. The reduced presence of these nuclei will scatter fewer thermal neutrons back into the nuclear reactor core, thus decreasing burnup. Adjusting operation 1504 may also have an effect on the neutron reflectivity characteristics of the neutron reflection assembly because the removed neutron moderating member may have displaced a volume of flowing neutron reflector material when it had been inserted in the neutron reflector assembly. An increase in volume of flowing neutron reflector material may tend to increase the amount of elastic collisions with neutrons emanating from the nuclear reactor core, thus increasing the likelihood of scattering fast neutrons emanating from the nuclear reactor core back into the reactor core to breed fertile material into fissile material.

Figure 17:
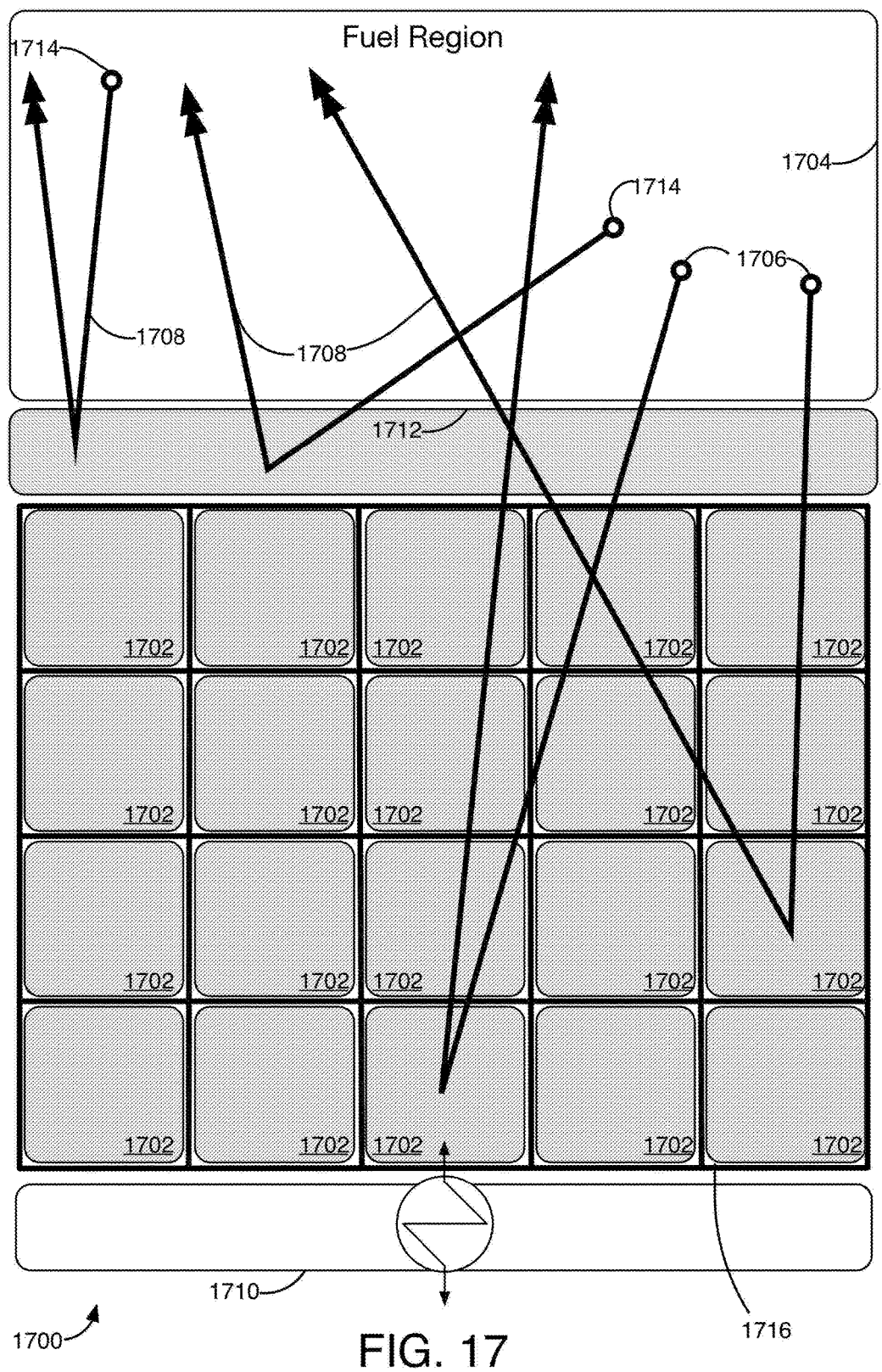
FIG. 17 depicts a top-down schematic view of an example neutron reflector assembly with a plurality of sleeves and a static neutron reflector sub-assembly.

FIG. 17 depicts a top-down schematic view of an example neutron reflector assembly 1700. Neutron reflector assembly 1700 includes two sub-assemblies, a primary static neutron reflector sub-assembly 1712 and a secondary dynamic neutron reflector sub-assembly 1716. In FIG. 17, example paths of fast spectrum neutrons 1706, 1714 are indicated by lines terminating in double arrows, such as lines 1708 indicate example fast spectrum neutrons. In an implementation, flowing neutron reflector assembly 1700 substantially surrounds a nuclear fuel region 1704 from which fast spectrum neutrons 1706, 1714 emanate.

Primary static neutron reflector sub-assembly 1712 may contain a neutron reflector material. The neutron reflector material contained in primary static neutron reflector sub-assembly 1712 may be a solid, liquid, or fluid neutron reflector material, or a combination thereof. The primary static neutron reflector sub-assembly 1712 may substantially surround a fuel region 1704. In another implementation, primary static neutron reflector sub-assembly 1712 may partially surround the fuel region 1704 in a continuous, segmented, and/or modular manner. The example fast spectrum neutrons 1714 emanating from nuclear fuel region 1704 are inelastically scattered (or reflected) from the primary static neutron sub-assembly 1716 and back into the nuclear fuel region 1704, thus increasing a breed rate of fertile fuel in the fuel region 1704. Other example fast spectrum neutrons, such as example neutrons 1706 may pass through primary static neutron reflector sub-assembly 1712, and be inelastically scattered (or reflected) from secondary dynamic neutron reflector sub-assembly 1716, as explained in more detail below.

The primary static neutron reflector sub-assembly 1712 may be disposed adjacent to, and/or in thermal contact with, the nuclear fuel region 1704. Due to the positioning of primary static neutron sub-assembly 1712 with respect to the nuclear fuel region 1704, the primary static neutron reflector sub-assembly 1712 may experience high levels of exposure to forces that may cause damage or wear. For example, the primary static neutron reflector sub-assembly may be exposed to high levels of heat and various types of radiation emanating from the nuclear fuel region 1704, including without limitation, alpha particles, beta particles, and/or gamma rays. Prolonged exposure to heat and/or radiation may cause the primary static neutron reflector sub-assembly 1712 to suffer excessive structural degrading over a period of time. The primary static neutron reflector sub-assembly 1712 may therefore be removable from flowing neutron reflector assembly 1700. In other words, the primary static neutron reflector sub-assembly may, or modular parts thereof, may be slidably fitted to a housing (not shown) to permit selective replacement of the sub-assembly, which may be carried out according to a periodic maintenance schedule or based on periodic inspection of the primary static neutron reflector sub-assembly 1712.

FIG. 17 also illustrates a secondary dynamic neutron reflector sub-assembly 1716. Secondary dynamic neutron reflector sub-assembly 1716 may be used to incrementally shift neutron spectrum in nuclear fuel region 1704 by selectively filling each of the channels 1702 with a volume of neutron reflector material. Secondary dynamic neutron reflector assembly 1716 may include a plurality of refractory-clad sleeves 1702 to conduct a flowing neutron reflector material therethrough. In FIG. 17, the neutron reflector material flows upward through a refractory clad channel 1702 toward the viewer. In an implementation, neutron reflector material may circulate in channels 1702 (e.g., cells, sleeves, conduits, etc.) with input and output ports above the nuclear fuel region 1704 such that no fixtures or ports are needed beneath the reactor. In other implementations, the neutron reflector material may flow in only one direction, either in an upward or downward direction, through the channels 1702 with one port above the nuclear fuel region 1704 and another port below fuel region 1704. In yet other implementations, the neutron reflector material may comprise a semi-stagnant or creeping flow through the channels 1702. In yet other implementations, the neutron reflector material may flow through radial input and output ports.

The secondary dynamic neutron reflector sub-assembly 1716 is in thermal communication with heat exchanger 1710 disposed on the opposite side from fuel region 1704. It is to be appreciated that the dynamic neutron reflector assembly and/or the heat exchanger could be inside, or disposed among the static reflector sub-assembly. The heat exchanger 1710 may contain one or more types of liquid coolant circulating therethrough. As secondary dynamic neutron reflector sub-assembly 1716 exchanges heat with the heat exchanger 1710, the heat exchanger 1710 may transport the heat away from the secondary dynamic neutron reflector sub-assembly 1716 as part of a secondary coolant circuit. The secondary coolant circuit may supply heat to electricity generation equipment, such as, for example, a steam-driven turbine. In an implementation, molten fuel salt may flow upward through the nuclear fuel region 1704 and downward through the heat exchanger 1710, thus exchanging heat as part of a primary coolant circuit. In other words, the heat exchangers may exchange heat with both the molten fuel salt and exchange heat with the flowing neutron reflector in the channels 1702. The flow rate of neutron reflector material may be adjusted to vary contact time with the heat exchangers to vary the temperature of reflector material flowing in the channels 1702. As the temperature of reflector material varies, its density changes accordingly. Changes in the density of the reflector material alter its neutron reflective characteristics as denser materials have a higher mass per unit volume and are therefore more likely to reflect neutrons.

Figure 18:
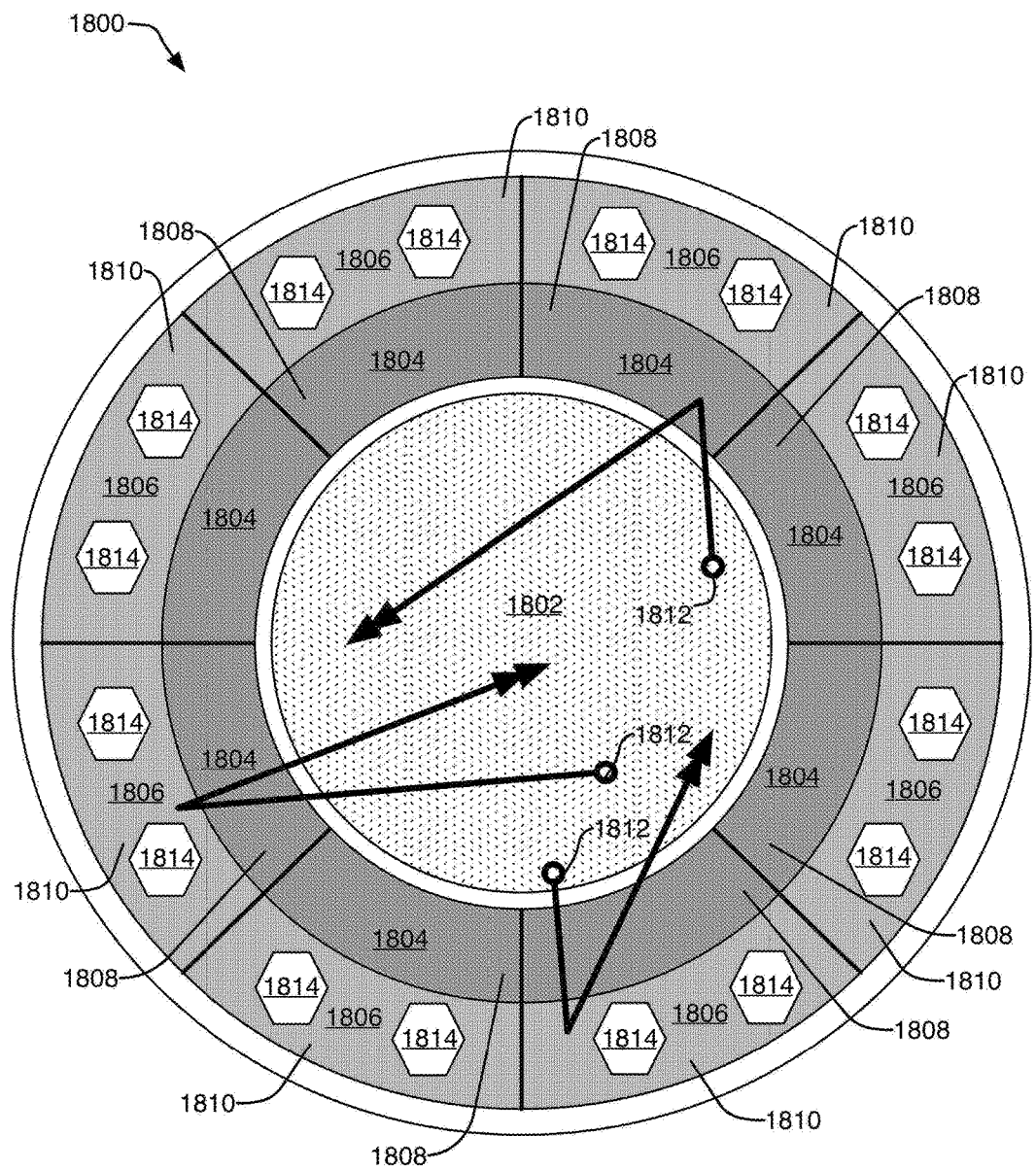
FIG. 18 depicts a top-down schematic view of an example molten nuclear fuel salt fast reactor core surrounded by a neutron reflector assembly including an inner annular channel and an outer annular channel and further including volumetric displacement members.

FIG. 18 is a top-down schematic view of a molten nuclear fuel salt fast reactor core with a fuel region 1802 surrounded by a neutron reflector assembly 1800. The neutron reflector assembly includes an inner annular channel 1808 and outer annular channel 1810 surrounding fuel region 1802. The inner and outer annular channels 1808, 1810 may contain neutron reflector materials 1804 and 1806, respectively. The neutron reflector materials 1804, 1806 may be the same or differ from one another in terms of their respective neutron-reflecting properties or other properties that may affect performance of the neutron reflector assembly (viscosity, density, specific heat value, etc.). Neutron reflector materials 1804, 1806 may tend to reflect example fast neutrons 1812 back into fuel region 1802.

Neutron reflector materials 1804, 1806 may be selectively added, removed, and/or replaced in channels 1808, 1810 to dynamically alter the neutron reflecting characteristics of the neutron reflector assembly 1800 over time. In one implementation, one or both of the neutron reflector materials 1804, 1806 may be completely removed from their respective channels 1808, 1810 to alter the neutron reflecting characteristics of the neutron reflector assembly 1800. In another implementation, the neutron reflector materials 1804, 1806 may be the same material. In yet another implementation, the neutron reflector materials 1804, 1806 may be selectively added, removed, and/or replaced to provide lower neutron reflection near the beginning of the life of the reactor when there is greater breeding of fertile fuel, and selectively added, removed, and/or replaced to provide greater neutron reflection as the reactor ages and burnup begins to dominates in the fuel region 1802. In another implementation, neutron reflector materials 1804, 1806 may mix inside one or both of channels 1808, 1810. In yet another implementation, one or both of neutron reflector materials 1804, 1806 may be added over time to channels 1808, 1810 to alter the ratio between the two materials and thus the neutron reflectivity of the assembly. If more than two neutron reflector materials 1804, 1806 are mixed inside channels 1808, 1810, a separator component (not shown) may operate to separate the materials if desired and may operate in any suitable manner to separate the two or more neutron reflector materials including one or more suitable chemical, mechanical, magnetic, electrical, time-bases processes based on the chemical and physical properties of the two or more neutron reflector materials. In another embodiment, mixed neutron reflector materials 1804, 1806 may be separated via a flush operation. Alternatively, the neutron reflector materials 1804, 1806 may be held in separate reservoirs (not shown) to selectively source the flows into one or both of channels 1808, 1810.

In an implementation, neutron reflector materials 1804, 1806 may circulate in channels 1808, 1810 with input and output ports above fuel region 1802 such that no fixtures or ports are needed beneath the reactor. In other implementations, neutron reflector materials 1804, 1806 may flow in only one direction, either in an upward or downward direction, through channels 1808, 1810 with one port above fuel region 1802 and another port below fuel region 1802. In yet other implementations, neutron reflector materials 1804, 1806 may comprise a semi-stagnant or creeping flow through channels 1808, 1810. In yet other implementations, neutron reflector materials 1804, 1806 may flow through radial input and output ports.

In another implementation, the channels 1808, 1810 may be selectively filled with materials that are not neutron reflectors. In one example, the channels 1808, 1810 may be filled with neutron moderating materials, neutron absorbing materials, or neutronically translucent materials. In another implementation, one or both of the channels 1808, 1810 may include selectively insertable volumetric displacement members 1814. Volumetric displacement members 1814 may contain neutron moderating materials, neutron absorbing materials, or neutronically translucent materials. Upon insertion of volumetric displacement members 1814, the volume of the reflecting liquid 1804, 1806 in the channel into which the volumetric displacement member has been inserted is reduced. With reduced volume, the remaining neutron reflector material 1804, 1806 in the channel has an altered neutron reflectivity characteristic, and is therefore less likely to reflect neutrons than before the volumetric displacement member 1814 was inserted.

Figure 19:
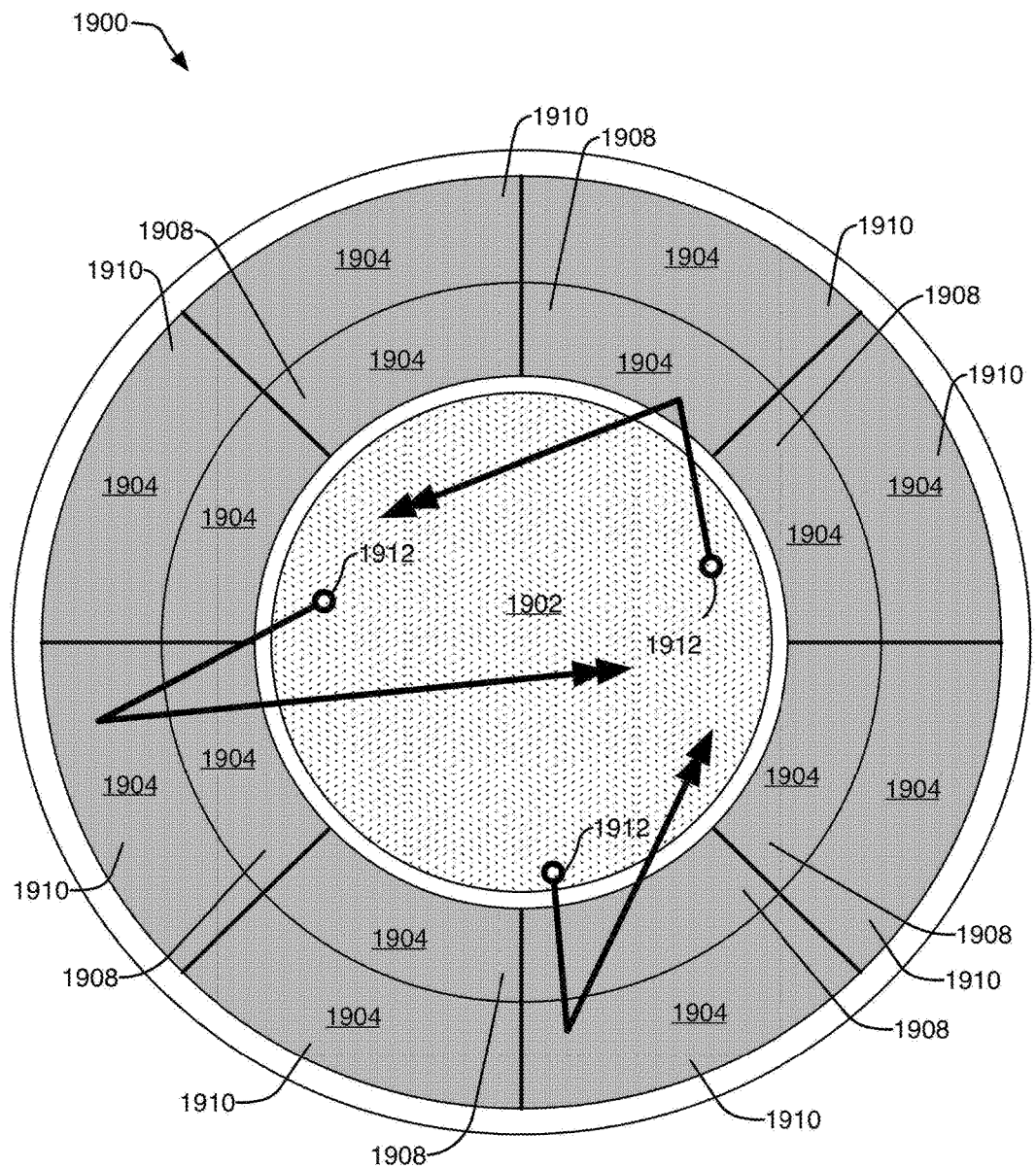
FIG. 19 depicts a top-down schematic view of an example molten nuclear fuel salt fast reactor core surrounded by a neutron reflector assembly including an inner annular channel and an outer annular channel.

FIG. 19 is a top-down schematic view of a molten nuclear fuel salt fast reactor core with a fuel region 1902 surrounded by a neutron reflector assembly 1900. The neutron reflector assembly includes an inner annular channel 1908 and outer annular channel 1910 surrounding fuel region 1902. The inner and outer annular channels 1908, 1910 may contain a neutron reflector material 1904. In an implementation, neutron reflector material 1904 may circulate in channels 1908, 1910 with input and output ports above fuel region 1902 such that no fixtures or ports are needed beneath the reactor. In other implementations, neutron reflector material 1904 may flow in only one direction, either in an upward or downward direction, through channels 1908, 1910 with one port above fuel region 1902 and another port below fuel region 1902. In yet other implementations, neutron reflector material 1904 may comprise a semi-stagnant or creeping flow through channels 1908, 1910. In yet other implementations, neutron reflector material 1904 may flow through radial input and output ports.

In one implementation, neutron reflector material 1904 may flow through channels 1908, 1910 at time periods near the beginning of the life of the reactor with fuel region 1902. As the reactor breeds fertile fuel over time, the effectiveness of the neutron reflector assembly 1900 may decrease because the inventory of bred nuclear fuel may exceed the amount needed to fuel the reactor. It may be desirable to therefore replace a portion of the neutron reflector material in part of the neutron reflector assembly as shown in FIG. 20 to alter the shape of the neutron reflector assembly 1900 over time.

Figure 20:
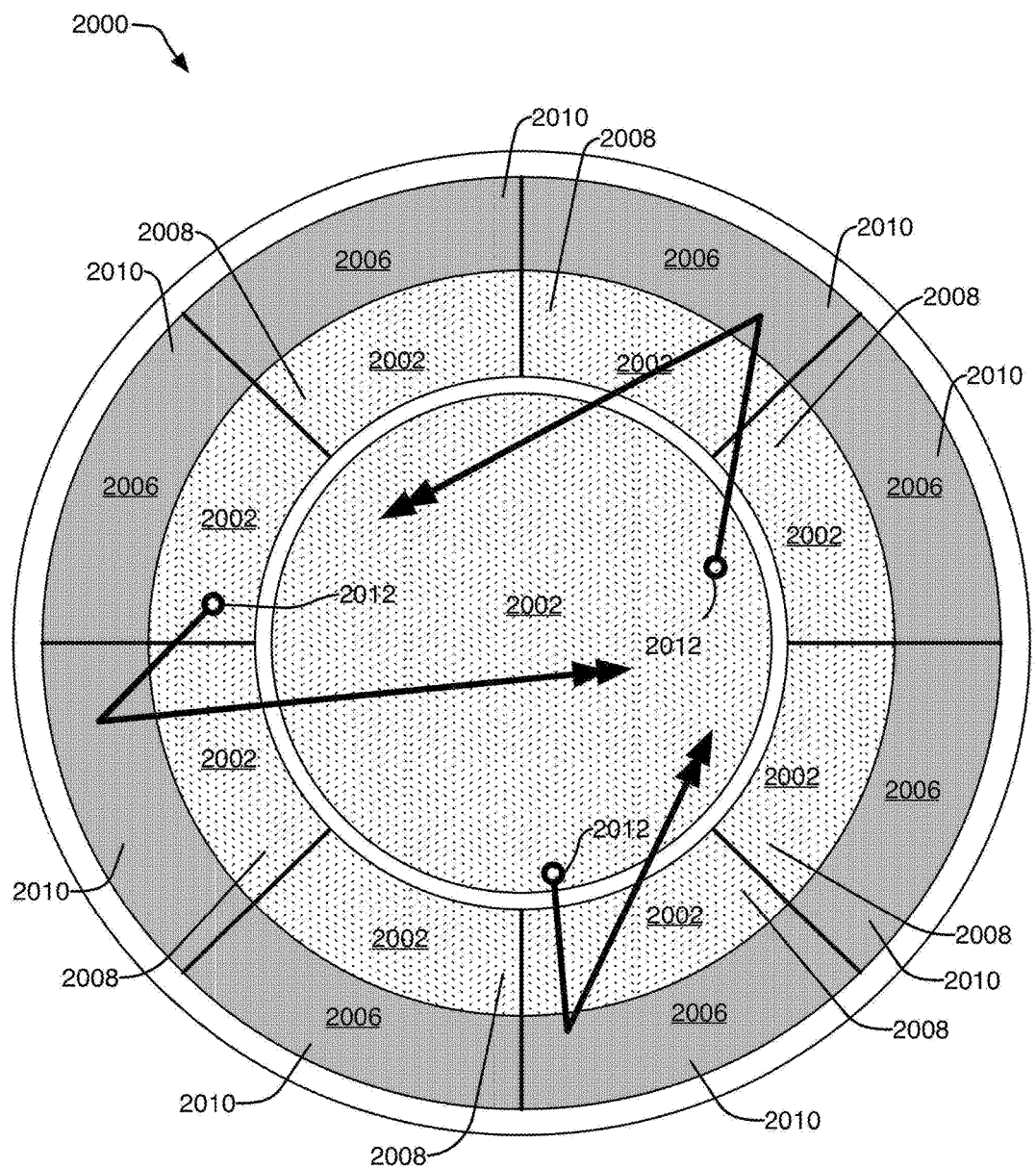
FIG. 20 depicts a top-down schematic view of an example molten nuclear fuel salt fast reactor core surrounded by a neutron reflector assembly including an inner annular channel and an outer annular channel wherein the inner annular channel contains a volume of molten fuel salt.

FIG. 20 is a top-down schematic view of a molten nuclear fuel salt fast reactor core with a fuel region 2002 surrounded by a neutron reflector assembly 2000. In FIG. 20 the neutron reflector material contents of inner annular channels 2008 are selectively replaced with additional fuel salt from fuel region 2002. As a result, the reactor will experience less neutron "leak." Example fast neutrons 2012 may continue to experience reflection against neutron reflection material 2006 in channel 2010. It is therefore possible to start a fission reaction in the reactor core with a smaller volume of fuel salt near the beginning of the life of the reactor because more fissile fuel materials may be bred as the reactor operates. The additional bred fuel may replace a volume of neutron reflector material in the channels 2008. This may lower the upfront cost of operating the reactor and enhance the breeding of the reactor later in life when breeding is more challenging due at least in part to built-up fission products. Neutron reflector materials 2006 may tend to reflect example fast neutrons 2012 back into the fuel salt, whether the example fast neutrons 2012 emanate from fuel region 2002 or from inner annular channels 2008.

Figure 21:
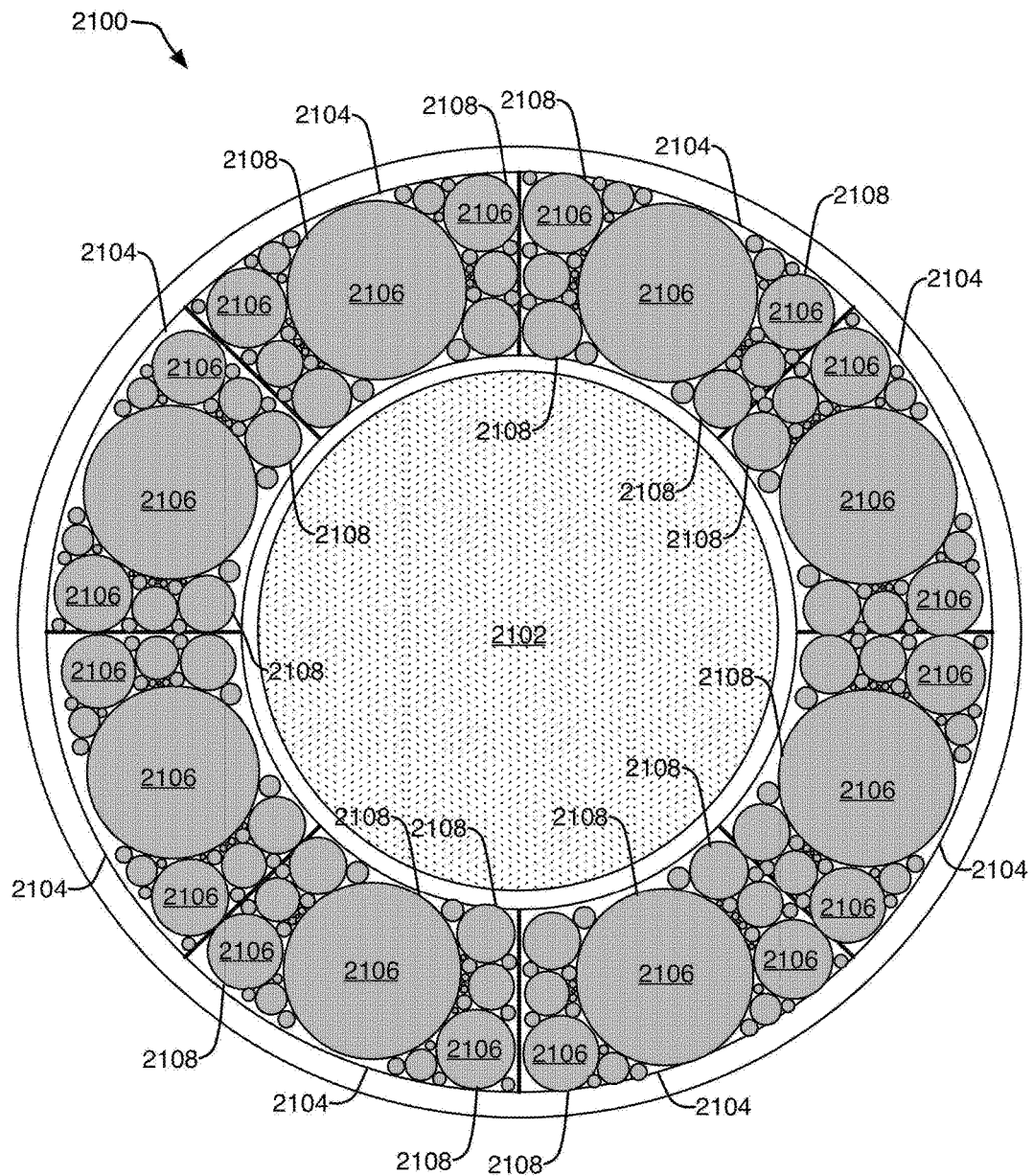
FIG. 21 is a top-down schematic view of an example molten nuclear fuel salt fast reactor core surrounded by a neutron reflector assembly including an annular channel containing tubes of varying radius values.

FIG. 21 is a top-down schematic view of a molten nuclear fuel salt fast reactor core with a fuel region 2102 surrounded by a neutron reflector assembly 2100. The neutron reflector assembly includes a plurality of annular channels 2104 surrounding the fuel region 2102. The annular channels 2104 may contain a plurality of tubes 2108 containing a flowing neutron reflector material 2106 in neutronic communication with the fuel region 2102. In an implementation, the plurality of tubes 2108 are cylindrical tubes. The flowing neutron reflector material 2106 may be circulated in the tubes 2108 with input and output ports above fuel region 2102 such that no fixtures or ports are needed beneath the reactor. In other implementations, neutron reflector material 2106 may flow in only one direction, either in an upward or downward direction, through the tubes 2108 with one port above fuel region 2102 and another port below fuel region 2102. In yet other implementations, neutron reflector material 2106 may comprise a semi-stagnant or creeping flow through tubes 2108. The tubes 2108 are arranged such that the radius of all tubes 2108 is not equal. As such, a plurality of tubes 2108 with varying radius values may be disposed in a channel 2104. In an implementation, tubes 2108 of varying radius may flow neutron reflector material in a volume that occupies a cross-sectional area of 80% of the cross-sectional area of the channels 2104. Numerals have not been assigned to every tube to improve readability due to the large number of tubes 2108 depicted in FIG. 21. This disclosure should be understood as indicating that each tube shown in channels 2104 is a tube 2108 containing neutron reflector material 2106, even those that are not so numbered therein.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A system comprising:
a neutron reflector assembly configured to surround a nuclear reactor core during a sustained nuclear fission reaction; and
the neutron reflector assembly being further configured to adjust fast neutron flux and thermal neutron flux within the reactor core by altering reflectivity characteristics of reflector material in the neutron reflector assembly during a sustained nuclear fission reaction;
wherein the neutron reflector assembly includes a plurality of cylindrical tubes containing reflector material, at least two of the tubes in the plurality of tubes having different radius values.

2. The system of claim 1, further comprising:
a heat exchanger, wherein the neutron reflector assembly is in thermal communication with the heat exchanger.

3. The system of claim 2, further comprising:
a molten nuclear fuel salt in the nuclear reactor core, wherein the neutron reflector assembly is in thermal communication with the molten nuclear fuel salt.

4. The system of claim 3, further comprising:
a tube and shell heat exchanger, wherein the neutron reflector assembly is in thermal communication with the molten nuclear fuel salt via the tube and shell heat exchanger.

5. The system of claim 1, wherein the reflector material includes a flowing liquid neutron reflector.

6. The system of claim 5, further comprising a flowing liquid neutron reflector spillover reservoir.

7. The system of claim 1, wherein the neutron reflector assembly includes a plurality of refractory clad sleeves.

8. The system of claim 1, further comprising a plurality of neutron moderating members, each neutron moderating member selectively insertable into neutron reflector assembly.

9. The system of claim 5, wherein the flowing liquid neutron reflector is molten lead.

10. The system of claim 5, wherein the flowing liquid neutron reflector is molten lead-bismuth.

11. The system of claim 5, wherein the neutron reflector assembly is further configured to maintain the flowing liquid neutron reflector in a creeping flow.

12. The system of claim 1, wherein the neutron reflector assembly includes a flowing liquid moderator.

13. The system of claim 1, wherein the neutron reflector assembly includes a primary static neutron reflector sub-assembly and a secondary dynamic neutron reflector sub-assembly.

14. The system of claim 1, wherein the neutron reflector assembly includes a plurality of cylindrical tubes flowing reflector material in neutronic communication with the nuclear reactor core during the sustained nuclear fission reaction.

15. A system comprising:
a neutron reflector assembly configured to surround a nuclear reactor core during a sustained nuclear fission reaction;
the neutron reflector assembly being further configured to adjust fast neutron flux and thermal neutron flux within the reactor core by altering reflectivity characteristics of reflector material in the neutron reflector assembly during a sustained nuclear fission reaction;
a heat exchanger, wherein the neutron reflector assembly is in thermal communication with the heat exchanger; and
a molten nuclear fuel salt in the nuclear reactor core, wherein the neutron reflector assembly is in thermal communication with the molten nuclear fuel salt.

16. The system of claim 15, wherein the heat exchanger is a tube and shell heat exchanger.

17. The system of claim 15, wherein the heat exchanger is a tube and shell heat exchanger and the neutron reflector assembly is in thermal communication with the molten nuclear fuel salt via the tube and shell heat exchanger.

18. The system of claim 15, wherein the reflector material includes a flowing liquid neutron reflector.

19. The system of claim 18, further comprising a flowing liquid neutron reflector spillover reservoir.

20. The system of claim 15, wherein the neutron reflector assembly includes a plurality of refractory clad sleeves.

21. The system of claim 15, further comprising a plurality of neutron moderating members, each neutron moderating member selectively insertable into neutron reflector assembly.

22. The system of claim 18, wherein the flowing liquid neutron reflector is molten lead.

23. The system of claim 18, wherein the flowing liquid neutron reflector is molten lead-bismuth.

24. The system of claim 18, wherein the neutron reflector assembly is further configured to maintain the flowing liquid neutron reflector in a creeping flow.

25. The system of claim 15, wherein the neutron reflector assembly includes a flowing liquid moderator.

26. The system of claim 15, wherein the neutron reflector assembly includes a primary static neutron reflector sub-assembly and a secondary dynamic neutron reflector sub-assembly.

27. The system of claim 15, wherein the neutron reflector assembly includes a plurality of cylindrical tubes flowing reflector material in neutronic communication with the nuclear reactor core during the sustained nuclear fission reaction at least two of the tubes in the plurality of tubes having different radius values.

* * * * *